United States Patent
Turnbull et al.

(10) Patent No.: US 6,465,963 B1
(45) Date of Patent: Oct. 15, 2002

(54) HEADLIGHT CONTROL SYSTEM UTILIZING INFORMATION FROM A MICROWAVE RECEIVER

(75) Inventors: Robert R. Turnbull, Holland, MI (US); Robert C. Knapp, Coloma, MI (US); Eric J. Walstra, Grand Rapids, MI (US)

(73) Assignee: Gentex Corporation, Zeeland, MI (US)

( * ) Notice: Subject to any disclaimer, the term of this patent is extended or adjusted under 35 U.S.C. 154(b) by 21 days.

(21) Appl. No.: 09/605,102

(22) Filed: Jun. 28, 2000

Related U.S. Application Data

(62) Division of application No. 09/250,086, filed on Feb. 16, 1999, now Pat. No. 6,166,698.

(51) Int. Cl.⁷ .............................................. H05B 37/00
(52) U.S. Cl. ........................ 315/82; 315/157; 307/10.8
(58) Field of Search ............................ 315/82, 83, 149, 315/157, 158, 159; 307/10.8

(56) References Cited

U.S. PATENT DOCUMENTS

| | | |
|---|---|---|
| 2,632,040 A | 3/1953 | Rabinow |
| 2,827,594 A | 3/1958 | Rabinow |
| 4,692,798 A | 9/1987 | Seko et al. |
| 4,862,037 A | 8/1989 | Farber et al. |
| 4,891,559 A | 1/1990 | Matsumoto et al. |
| 4,930,742 A | 6/1990 | Schofield et al. |
| 4,967,319 A | 10/1990 | Seko |
| 5,036,437 A | 7/1991 | Macks |
| 5,124,549 A | 6/1992 | Michaels et al. |
| 5,166,693 A | 11/1992 | Nishikawa et al. |
| 5,173,708 A | 12/1992 | Suzuki et al. |
| 5,223,814 A | 6/1993 | Suman |
| 5,235,178 A | 8/1993 | Hegyi |
| 5,241,319 A | 8/1993 | Shimizu |
| 5,329,206 A | 7/1994 | Slotkowski et al. |

(List continued on next page.)

FOREIGN PATENT DOCUMENTS

| | | |
|---|---|---|
| DE | 2946561 | 5/1981 |
| EP | 0452970 | 10/1991 |

(List continued on next page.)

OTHER PUBLICATIONS

Christopher M. Kormanyos, SAE Paper No. 980003, pp. 13–18, Feb. 1998.

Franz–Josef Kalze, SAE Paper No. 980005, pp. 23–26, Feb. 1998.

J.P. Löwenau et al., SAE Paper No. 980007, pp. 33–38, Feb. 1998.

Tohru Shimizu et al., SAE Paper No. 980322, pp. 113–117, Feb. 1998.

*Primary Examiner*—David Vu
(74) *Attorney, Agent, or Firm*—Price, Heneveld, Cooper, DeWitt & Litton

(57) ABSTRACT

An inventive rearview mirror assembly is disclosed in which a microwave antenna is mounted so as to receive transmissions from one or more satellites through the front windshield of the vehicle. The microwave antenna may be tuned to receive satellite transmissions from a position identification system constellation of satellites, such as GPS or GLONASS. Additionally, the microwave antenna may be tuned to alternatively or additionally receive transmissions from at least one communication satellite, such as a CD radio satellite. In addition to the inventive rearview mirror assembly, an inventive electrical control system is disclosed that may be used as a navigation system, an electrochromic rearview mirror control system, a head lamp control system, a tire pressure monitoring and display system, a temperature sensing and display system, a vehicle compass system, a vehicle data recorder system, and/or a vehicle odometer verification system. In each of the above systems, new parameters are made available by the microwave antenna to perform control operations not previously performed.

39 Claims, 10 Drawing Sheets

U.S. PATENT DOCUMENTS

| | | |
|---|---|---|
| 5,416,318 A | 5/1995 | Hegyi |
| 5,426,294 A | 6/1995 | Kobayashi et al. |
| 5,448,250 A | 9/1995 | Day |
| 5,451,822 A | 9/1995 | Bechtel et al. |
| 5,508,592 A | 4/1996 | Lapatovich et al. |
| 5,512,901 A | 4/1996 | Chen et al. |
| 5,521,604 A | 5/1996 | Yamashita |
| 5,537,003 A | 7/1996 | Bechtel et al. |
| 5,557,285 A | 9/1996 | Bender et al. |
| 5,576,687 A | 11/1996 | Blank et al. |
| 5,587,715 A | 12/1996 | Lewis |
| 5,614,788 A | 3/1997 | Mullins et al. |
| 5,629,709 A | 5/1997 | Yamashita |
| 5,660,454 A | 8/1997 | Mori et al. |
| 5,666,028 A | 9/1997 | Bechtel et al. |
| 5,671,996 A | 9/1997 | Bos et al. |
| 5,706,015 A | 1/1998 | Chen et al. |
| 5,708,410 A | 1/1998 | Blank et al. |
| 5,715,093 A | 2/1998 | Schierbeek et al. |
| 5,724,316 A | 3/1998 | Brunts |
| 5,761,094 A | 6/1998 | Olson et al. |
| 5,774,828 A | 6/1998 | Brunts et al. |
| 5,790,973 A | 8/1998 | Blaker et al. |
| 5,796,094 A | 8/1998 | Schofield et al. |
| 5,796,176 A | 8/1998 | Kramer et al. |
| 5,796,365 A | 8/1998 | Lewis |
| 5,798,575 A | 8/1998 | O'Farrell et al. |
| 5,815,093 A | 9/1998 | Kikinis |
| 5,825,096 A | 10/1998 | Morimoto et al. |
| 5,828,337 A | 10/1998 | Aoshima et al. |
| 5,828,585 A | 10/1998 | Welk et al. |
| 5,829,782 A | 11/1998 | Breed et al. |
| 5,837,994 A | 11/1998 | Stam et al. |
| 5,838,562 A | 11/1998 | Gudat et al. |
| 5,848,373 A | 12/1998 | DeLorme et al. |
| 5,848,902 A | 12/1998 | Yamaguchi et al. |
| 5,854,593 A | 12/1998 | Dykema et al. |
| 5,910,854 A | 6/1999 | Varaprasad et al. |
| 5,938,321 A | 8/1999 | Bos et al. |
| 5,942,853 A | 8/1999 | Piscart |
| 5,959,581 A | 9/1999 | Fusinski |
| 5,971,552 A | 10/1999 | O'Farrell et al. |
| 5,973,648 A | 10/1999 | Lindenmeier et al. |
| 5,990,469 A | 11/1999 | Bechtel et al. |
| 6,011,518 A | 1/2000 | Yamagishi et al. |
| 6,019,475 A | 2/2000 | Lynam et al. |
| 6,039,390 A | 3/2000 | Agrawal et al. |
| 6,052,084 A | 4/2000 | Aoshima et al. |
| 6,052,645 A | 4/2000 | Harada |
| 6,097,023 A | 8/2000 | Schofield et al. |

FOREIGN PATENT DOCUMENTS

| | | |
|---|---|---|
| EP | 0555586 | 2/1996 |
| EP | 0567268 | 10/1997 |
| EP | 0685705 | 1/1999 |
| EP | 0690289 | 3/1999 |
| JP | 63262904 | 10/1988 |
| JP | 4336821 | 11/1992 |
| JP | 5142321 | 6/1993 |
| JP | 6102334 | 4/1994 |
| JP | 6104780 | 4/1994 |
| JP | 8166221 | 6/1996 |
| WO | 8605147 | 9/1986 |
| WO | 9520249 | 7/1995 |
| WO | 9721127 | 6/1997 |
| WO | 9735743 | 10/1997 |
| WO | 9843850 | 10/1998 |
| WO | 9947396 | 9/1999 |
| WO | 0022881 | 4/2000 |

HEADLIGHT CONTROL SYSTEM UTILIZING INFORMATION FROM A MICROWAVE RECEIVER

CROSS-REFERENCE TO RELATED APPLICATION

This application is a divisional of U.S. patent application Ser. No. 09/250,086, now U.S. Pat. No. 6,166,698, entitled REARVIEW MIRROR WITH INTEGRATED MICROWAVE RECEIVER.

BACKGROUND OF THE INVENTION

The present invention generally relates to a rearview mirror for a vehicle and to microwave receivers and antennas. More specifically, the present invention relates to electrochromic rearview mirror assemblies and control systems, vehicle navigation systems, satellite-to-vehicle communications, vehicle compass systems, vehicle head lamp control systems, vehicle temperature sensing and display systems, and vehicle tire pressure sensing and display systems.

Vehicle position identification systems are known and commonly used in vehicles for purposes relating to vehicle navigation and tracking systems. Currently, two such position identification systems that are in use are GPS and GLONASS, both of which utilize a constellation of satellites that transmit microwave signals towards the earth that, in turn, are received by a ground-based microwave receiver and used to determine the position of the receiver on the earth's surface. Such systems are capable of a very high degree of accuracy. As a result, a great deal of research has been conducted to construct navigation systems that may be readily incorporated into a vehicle.

Position identification systems have also been used in vehicles with respect to communication systems, particularly emergency communication systems, whereby a vehicle occupant making an emergency call using a cellular telephone need not actually know the vehicle's exact location in order to have emergency vehicles dispatch to that location. Examples of such systems include the ONSTAR® system from General Motors Corporation and the AUTOLINK® system available from Johnson Controls, Inc. Other uses of position identification systems in vehicles include the use of position information to identify the time zone that the vehicle is currently in, and the use of such position data to determine which zone of magnetic variance the vehicle is in for purposes of calibrating an in-vehicle electronic compass. See U.S. Pat. Nos. 5,724,316 and 5,761,094, respectively.

Despite all the research that has been conducted and all the literature that has been generated relating to the use of position identification systems in vehicular applications, little consideration had been given to the practicalities of where to mount the microwave antenna that is to receive the microwave signals from the satellites. Published International Application No. WO 97/21127 discloses the mounting of two separate microwave antennas in the two external rearview mirror housings of the vehicle. While there are two microwave antennas located in the external rearview mirror housings, the system receiver circuit is located in the interior of the vehicle. The separation of the receiver circuit from the antennas introduces significant manufacturing difficulties. Coaxial cable typically used to connect the antenna to the receiver is expensive and difficult to handle in a manufacturing process, since it cannot be kinked and is relatively difficult to terminate. Furthermore, such coaxial cable typically has a relatively expensive push-on or screw-on type connectors that connect it to the system receiver circuit and/or microwave antenna. Additionally, vehicle manufacturers have expressed an unwillingness to require their assembly line workers to connect the components using such a coaxial connector.

Locating a microwave antenna in the external rearview mirror housings is also disadvantageous because of the likelihood that dirt, moisture, snow, and humid air may readily reach the microwave antenna and adversely affect its performance. Also, because the reception of microwave signals by the microwave antennas is adversely affected by any metallic or other electrically conductive materials that may exist between the satellites and the antenna, it is necessary to utilize two separate antennas to allow for a sufficient field of view of the satellites so as to accurately determine the vehicle's position. Obviously, the need for this additional antenna significantly adds to the cost of implementing such a system, particularly when one takes into account the need to run two separate coaxial cables to the system receiver circuit. Further, even with a separate antenna mounted in each of the two exterior rearview mirrors, the overall field of view of the system is still restricted by the sides and roof of the vehicle.

While WO 97/21127 further suggests that the antenna could additionally be positioned within the mirror housing of an interior mirror of the vehicle, doing so is not preferred because the interior mirror housing is movable with respect to the passenger compartment, which may introduce error in the vehicle position measurements. Further, WO 97/21127 additionally states that metallic coatings on the vehicle windshield may interfere with the operation of a receiving antenna when mounted in an interior rearview mirror assembly. Additionally, like the configuration where the receiving antennas are mounted in the two exterior mirrors, the mounting of the receiving antenna in the interior rearview mirror housing also presents manufacturing problems associated in connecting the antenna with the receiver, which apparently is mounted in the vehicle instrument panel.

SUMMARY OF THE INVENTION

Therefore, it is an aspect of the present invention to solve the above problems by mounting a microwave antenna in a location within a vehicle where it is protected from rain, dirt, and snow, and where the antenna has the least obstructed field of view of the sky. It is an additional aspect of the present invention to provide a location for mounting the microwave antenna where the corresponding microwave receiver may also be mounted, so as to eliminate difficulties in running a connecting coaxial cable therebetween. Further, it is an aspect of the present invention to mount a microwave antenna in a location within a vehicle, where its reception is least likely to be affected by the conductive body structure of the vehicle and where it may be mounted in an aesthetically pleasing location. It is another aspect of the present invention to provide an assembly incorporating a microwave antenna that is compatible with standard manufacturing practices and that can be readily retrofit into the vehicle or installed by a dealer.

The present invention achieves these and other aspects and advantages by mounting a microwave antenna in a mounting bracket of an inside rearview mirror assembly of a vehicle. Accordingly, an inside rearview mirror assembly of the present invention comprises a mounting bracket adapted to be mounted to a vehicle in a location proximate to or on the windshield of the vehicle, a mirror housing coupled to the mounting subassembly, a mirror mounted in the mirror housing, and a microwave antenna mounted to the mounting bracket proximate the windshield. In a most preferred construction, the rearview mirror assembly of the present invention further includes a microwave receiver circuit having at least a portion thereof mounted to the mounting bracket, with the microwave receiver circuit being electrically coupled to the microwave antenna.

Other inventive features are described below that relate to vehicle and vehicle accessory control that is responsive to vehicle position data. Other inventive features also described below relate to the provision of a microwave receiver for receiving microwave signals and information from other types of communication satellites in an automobile environment. More specifically, some inventive aspects of the present invention that are described more fully below include an electrochromic mirror control system, a head lamp control system, a navigation system, a tire pressure monitoring system, a temperature sensing and display system, a vehicle compass system, a vehicle "black box" data recorder, and a vehicle odometer verification system.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

As discussed above, certain aspects of the present invention relate to the mounting of a microwave antenna to the mounting bracket of a vehicle inside rearview mirror assembly. As also described above, there are various other aspects of the present invention that relate to the use of information obtained from satellites through the microwave antenna in various vehicle and vehicle accessory control systems. While the mounting of the microwave antenna to the mounting bracket of an inside rearview mirror assembly is the most preferred location for mounting the microwave antenna, certain of the other aspects of the invention may be accomplished irrespective of where the microwave antenna is actually mounted in the vehicle. Accordingly, the following description is broken into separate headings, each relating to different aspects of the present invention.

1. Preferred Structural Features of the Present Invention

A. Preferred Antenna Mounting

Figure 1:
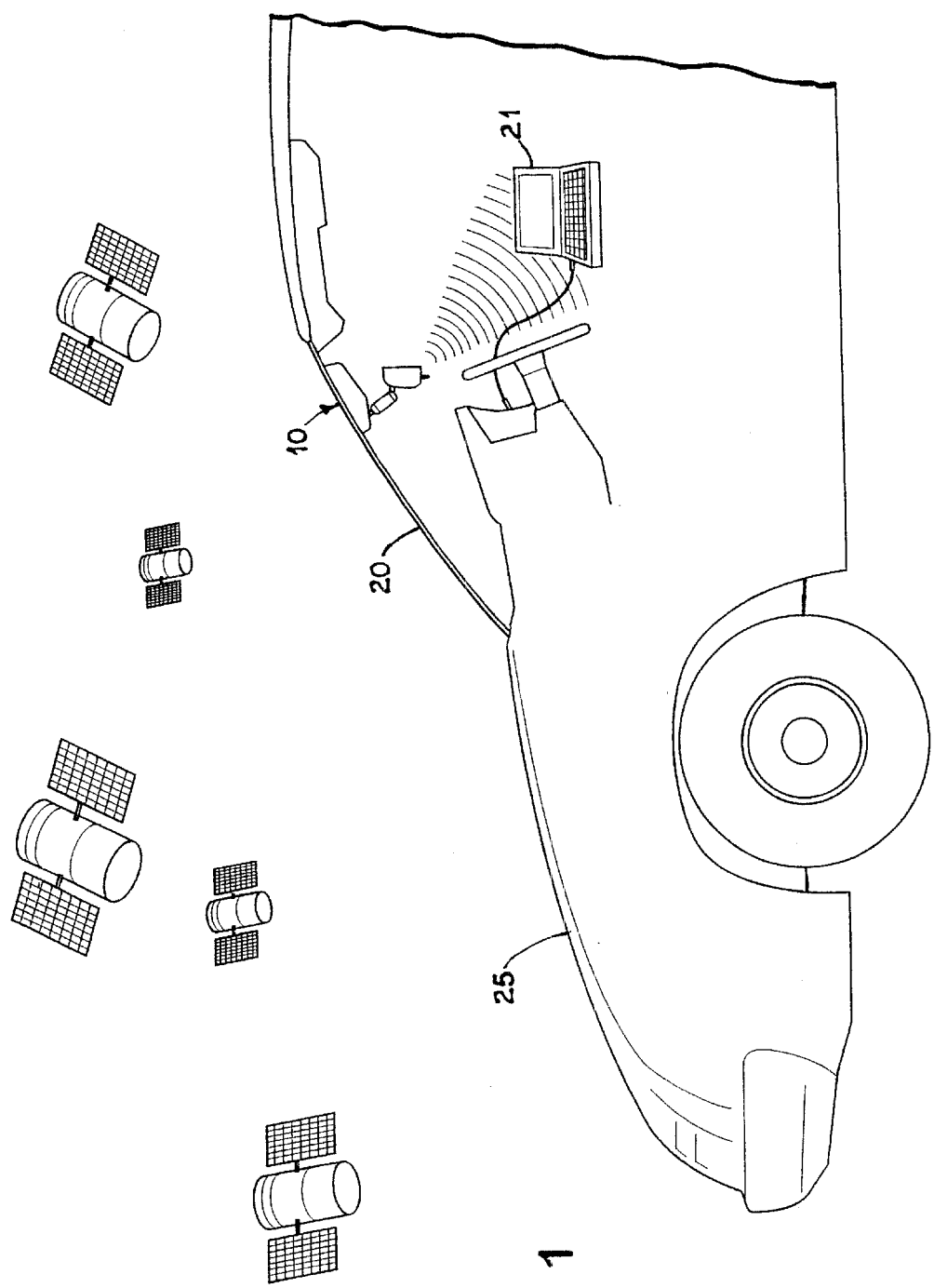
FIG. 1 is a cut-away perspective view of a vehicle in which the inventive rearview mirror assembly is mounted.

An inside rearview mirror assembly constructed in accordance with the present invention is shown in FIGS. 1–5. FIG. 1 shows the general mounting of rearview mirror assembly 10 to the inside surface of a front windshield 20 of a vehicle 25. FIGS. 2A and 2B show two different exemplary rearview mirror assembly constructions with which the present invention may be implemented. More specifically, rearview mirror assembly 10a shown in FIG. 2A is designed to be mounted directly to windshield 20, whereas rearview mirror assembly 10b shown in FIG. 2B is mounted to the roof of the vehicle. As will be apparent to those skilled in the art, the present invention may be implemented in virtually any inside rearview mirror assembly regardless of its particular construction.

Figure 2A:
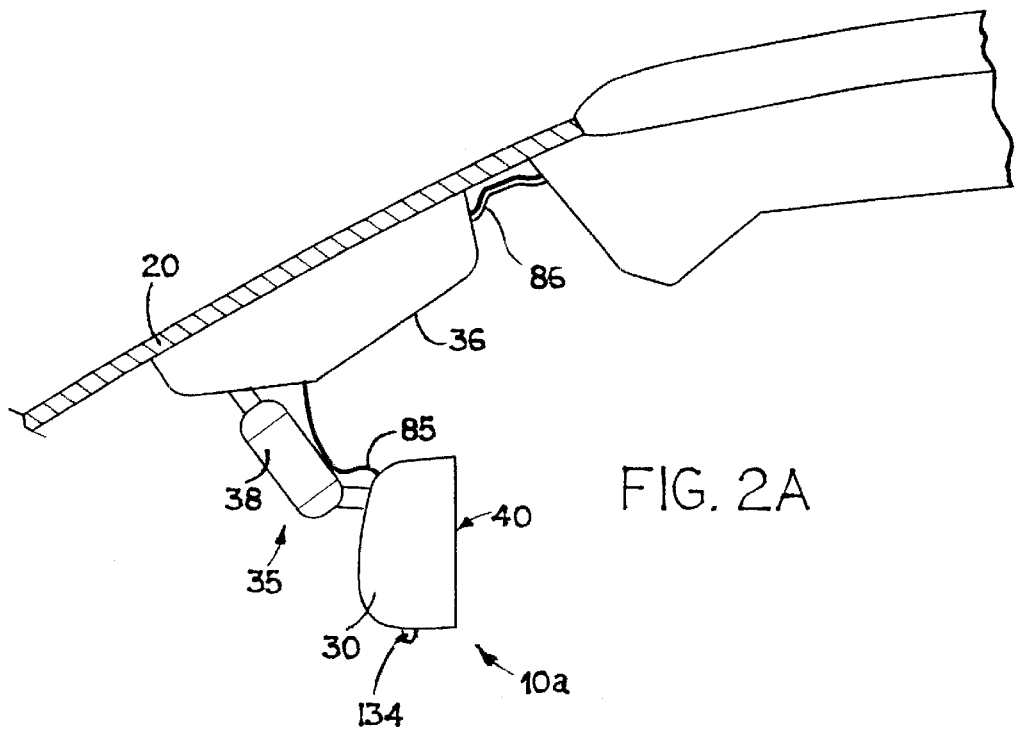
FIG. 2A is a perspective side view of a first embodiment of the inventive rearview mirror assembly.
Figure 2B:
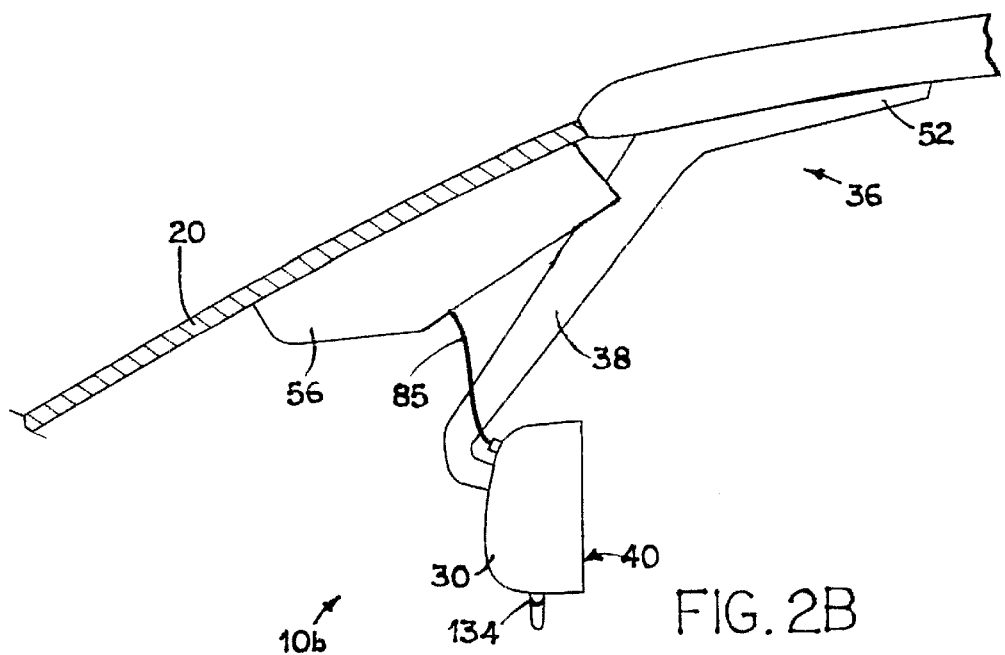
FIG. 2B is a perspective side view of a rearview mirror assembly constructed in accordance with a second embodiment of the present invention.

In general, rearview mirror assemblies include a mirror housing 30 that may have a wide variety of the possible designs, such as, for example, the mirror housing taught and claimed in U.S. Pat. No. 5,448,397. Rearview mirror assemblies also include a mounting bracket 35 that attaches mirror housing 30 to the vehicle. Such mounting brackets typically include a mounting foot 36 that is directly mounted to the vehicle and to a mirror stem 38 that extends between mounting foot 36 and mirror housing 30. As apparent from a comparison of FIGS. 2A and 2B, the structure of mounting foot 36 and mirror stem 38 may vary considerably from one rearview mirror assembly to the next. For example, mirror stem 38 may be pivotally mounted to mounting foot 36 as shown in FIG. 2A or fixedly attached to mounting foot 36 as shown in FIG. 2B. Additionally, mirror housing 30 is typically pivotally attached to mirror stem 38. Such pivotal attachments allow the driver to move and position the mirror so as to allow the driver to a have a clear field of view towards the rear of the vehicle.

While all rearview mirror assemblies include a mirror 40 (FIG. 5) mounted in mirror housing 30, mirror 40 may be a simple prismatic mirror or may be an electrochromic mirror having a reflectivity that may be automatically or manually varied.

Rearview mirror assemblies may also include a display 45 housed within mirror housing 30 or housed within mounting foot 36. Such a display may be laterally or vertically spaced from mirror 40 as shown in FIG. 2A, or may be provided behind mirror 40 so as to project information through mirror 40.

Figures 3, 4:
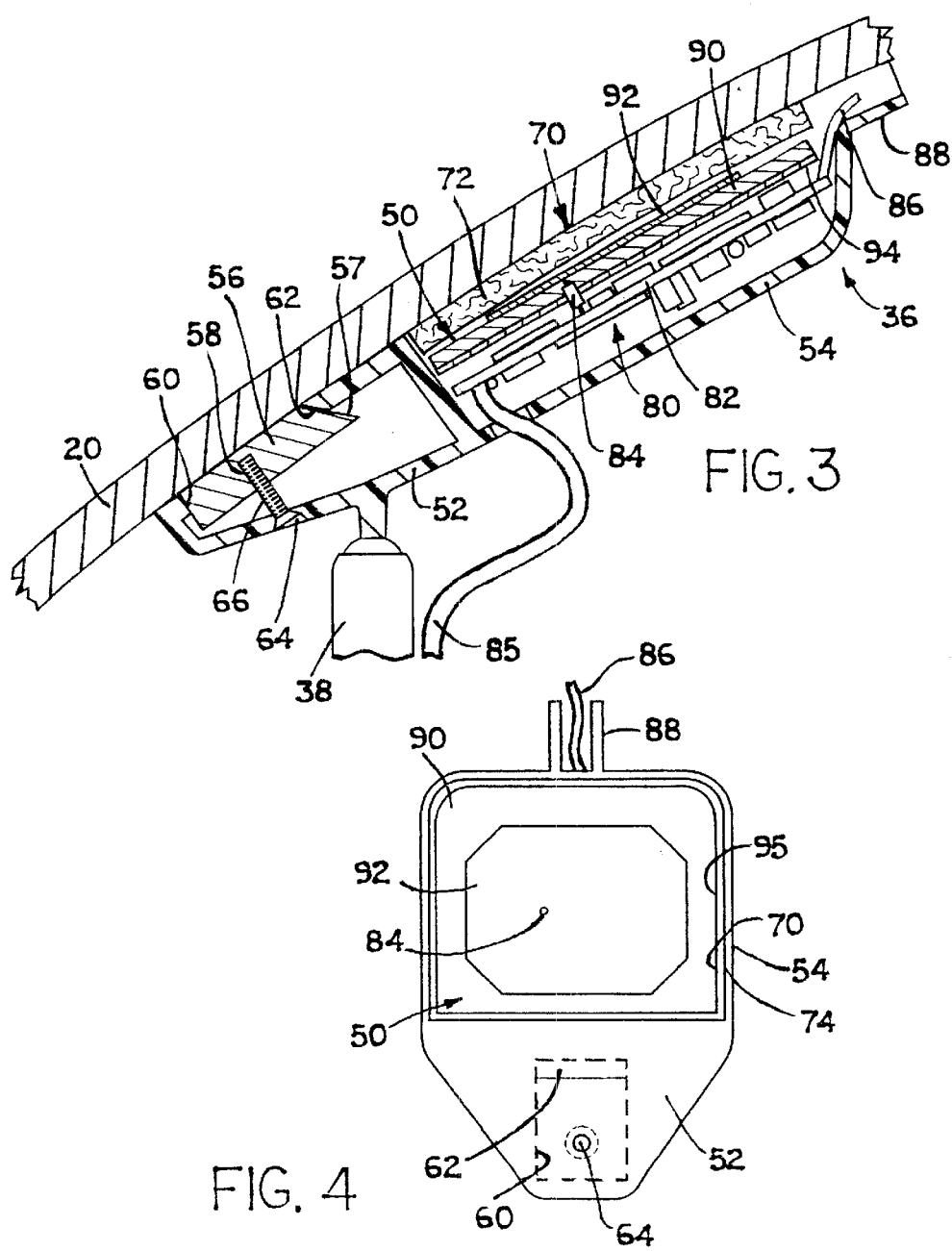
FIG. 3 is a cross-sectional view of the mounting foot of the inventive rearview mirror assembly constructed in accordance with the first embodiment of the present invention.
FIG. 4 is a perspective view of the forward-facing portion of the mounting foot of the rearview mirror assembly constructed in accordance with the first embodiment of the present invention.

As best shown in FIGS. 2A, 3, and 4, a microwave antenna 50 may be mounted within mounting foot 36 of mounting bracket 35 of rearview mirror assembly 10.

As best shown in FIG. 3, mounting foot 36 includes a mounting portion 52 and an antenna housing portion 54. Mounting portion 52 may be constructed to have virtually any conventional structure used to mount a rearview mirror to a windshield 20 or other structure of the vehicle. For purposes of example, the structure of mounting portion 52 is shown as being configured to attach to a mounting puck or button 56 that is attached to the inside surface of windshield 20 using an adhesive. Puck 56 includes an inclined edge surface 57 and a threaded aperture 58 formed in the surface of puck 56 opposite that which is adhered to windshield 20. Mounting portion 52 thus has an aperture 60 for engaging puck 56. One edge 62 of aperture 60 is a sloped profile so as to engage inclined edge surface 57 of puck 56. In this manner, the size of aperture 60 is slightly smaller than the area of the surface of puck 56 that is opposite that which is secured to windshield 20. To then secure mounting portion 52 to puck 56, a set screw 66 is slid into an aperture 64 formed in mounting portion 52 and turned so as to thread into threaded aperture 58 on puck 56. Again, it should be noted that the specific structure illustrated in FIG. 3 is provided for purposes of illustration only, and the present invention is not limited by the particular structure utilized to secure mounting foot 36 to windshield 20 or to any other portion of the vehicle.

Antenna housing portion 54 of mounting foot 36 may be integrally formed with mounting portion 52 or formed as a separate component that may be attached to mounting portion 52. Antenna housing portion 54 includes an aperture 70 having a generally square, rectangular, or round shape or any other shape for accommodating the particular shape of antenna 50. Aperture 70 is provided so as to open towards windshield 20 through which microwave signals from satellites may pass to reach microwave antenna 50. Antenna 50 is preferably mounted in aperture 70 so as to be substantially parallel to, and slightly spaced apart from, the inner surface of windshield 20. The structure of antenna 50 will be discussed further below under the heading "Preferred Antenna Construction."

As shown in FIG. 3, a foam pad 72 or other nonconductive substrate may be placed within antenna housing portion 54 between antenna 50 and the inside surface of windshield 20. Foam pad 72 is provided to prevent moisture or any debris from coming between antenna 50 and windshield 20. Also, by using a black or gray foam pad 72, antenna 50 may be covertly hidden from viewing from the outside of the vehicle and thus allow for antenna 50 to be mounted behind windshield 20 and yet maintain an aesthetically pleasing appearance. The foam pad should preferably be made of a material with low moisture absorption and low loss factor at microwave frequencies. Closed cell polyethylene foam or GORE-TEX® are two possible materials. The adhesive used to attach the foam should ideally be applied only to the perimeter of the antenna or pad as adhesives typically have much poorer moisture absorption and dielectric properties than the dielectric materials themselves. Alternatively, an O-ring could be used around the perimeter of the antenna to prevent moisture or any debris from coming between the antenna and windshield.

By extending antenna housing portion 54 from mounting portion 52 in a direction upward towards the upper region of windshield 20, antenna housing portion 54 may be located behind the tinted upper band on windshield 20 and thereby be more covertly hidden from view outside the vehicle. In the event that microwave antenna 50 is to be mounted behind a windshield made of conventional low-E glass, the electrically conductive layers within the low-E glass windshield should be masked out in the region behind which antenna 50 is to be mounted. In this manner, the conductive layers in the low-E glass will not interfere with the reception of satellite transmissions. Alternatively, a cut that electrically separates an area of the conductive low-E coating and forms a parasitic antenna element could be used. Such cuts can be made by a masking or laser cutting operation.

As shown in FIG. 4, antenna mounting portion 54 may also be configured to include a gasket 74 provided about the periphery of aperture 70, so as to provide for additional protection against moisture or debris coming between windshield 20 and antenna 50.

In addition to providing space for accommodating antenna 50, mounting foot 36 may also be configured to provide sufficient space for a receiver circuit 80 printed on a circuit board 82. Circuit board 82 may thus be mounted directly behind antenna 50 in antenna mounting portion 54, so as to minimize the length of, antenna connector 84 that extends between antenna 50 and printed circuit board 82. By providing sufficient space for both antenna 50 and receiver circuit 80, both these components may be prefabricated and fixedly mounted to one another prior to mounting an antenna housing portion 54., Thus, antenna 50 may be connected to receiver circuit 80 without requiring any coaxial cable or its associated connectors.

Because receiver circuit 80 converts the signals received by antenna 50 into signals that may be transmitted over conventional wires, the information obtained from the satellite signals may be transmitted to other components in the vehicle via the vehicle bus or by discrete connections. More specifically, if a display 45 or additional circuitry, such as a control circuit for an electrochromic mirror or electronic compass, is mounted in mirror housing 30, receiver circuit 80 may be coupled to such circuitry via a connector line 85 that may be run between mounting foot 36 and mirror housing 30 outside of mirror stem 38 or internally through mirror stem 38 as disclosed in U.S. patent application Ser. No. 09/123,682. Additionally or alternatively, data processed by receiver circuit 80 may be transmitted via line 86 to other electrical systems within the vehicle. Another alternative would be to transmit the data by infrared light or a low power RF transmitter. Mirror assembly 10 may include a shroud 88 that extends from mounting foot 36 to the vehicle headliner, so as to provide a covert channel for running cabling 86 between rearview mirror assembly 10 and the remainder of the vehicle.

While a specific and preferred antenna structure is described below, it will be appreciated by those skilled in the art that the mounting of microwave antenna 50 within mounting foot 36 may be accomplished regardless of the specific construction or type of microwave antenna 50 that is mounted therein.

B. Preferred Antenna Construction

Having described a preferred mounting for a microwave antenna within a vehicle, a preferred antenna structure will now be described with further reference to FIGS. 3 and 4. Microwave antenna 50 is preferably constructed as a patch antenna including a dielectric substrate 90 having a layer of a conductive material provided on one side of dielectric substrate 90 so as to form a resonant patch 92. Antenna 50 further includes a layer of electrically conductive material on the opposite side of dielectric substrate 90, which forms a conductive ground plane 94 for antenna 50. Antenna 50 may be constructed using materials that are conventional and well known for such use in such fixed-frequency patch antennas.

Resonant patch 92 may have a generally square shape with dimensions selected so as to tune antenna 50 to a resonant frequency at which particular satellites are transmitting. For example, GPS satellites transmit at 1.57542 GHz and GLONASS satellites transmit at 1.60256 to 1.61550 GHz, and CD radio satellites transmit at 2.31 to 2.36 GHz. The manner by which a patch antenna may be tuned to these frequencies is well known in the art. Because the windshield glass 20 forms a dielectric cover over antenna 50, the patch resonant frequency is slightly reduced from its free space value. To compensate for the effect of the glass, the patch dimensions or corners 95 of resonant patch 92 may be trimmed to compensate for this reduction in resonant frequency caused by windshield 20.

Although microwave antenna 50 is shown as having a generally planar construction, the antenna could be provided on a non-planar substrate thereby allowing greater flexibility in the mounting of antenna 50. Also, resonant patch 92 need not have a generally square shape but may be circular, rectangular, or fractal or have any shape known in the art provided it may be tuned to receive the desired satellite transmissions. If resonant patch 92 is rectangular, two major resonant frequencies corresponding to the average X and Y dimensions may be used to simultaneously receive microwave transmissions in two different frequency bands. Thus, for example, microwave antenna 50 could be configured to simultaneously receive both GPS and GLONASS transmissions so as to allow calculation of vehicle position using satellites from both position identification systems. Other possibilities include tuning the antenna to receive GPS transmissions and to receive CD radio satellite transmissions. Such CD radio transmissions may then be supplied to the audio system of the vehicle. As will be apparent to those skilled in the art, microwave antenna 50 could be dimensioned so as to be tuned to the resonant frequency of other satellite transmissions to receive information from such satellites that may be of particular use by the electrical systems of the vehicle or that may be displayed or played back to the vehicle occupants.

Receiver circuit 80 may optionally be attached to the ground plane surface 94 on antenna 50. One preferred implementation uses a four-layer printed circuit board with layers assigned as follows: resonant patch, antenna ground plane, receiver ground plane/secondary signal layer, and a last layer including the receiver primary signal layer and component mounting. It will be appreciated, however, that receiver circuit 80 may be mounted elsewhere, such as in mirror housing 30 behind mirror 40. If such an implementation is used, however, a coaxial cable would need to extend from mounting foot 36 to mirror housing 30. Nevertheless, the length of the coaxial cable would be relatively short and could be readily connected between antenna 50 and receiver circuit 80 by the OEM manufacturer of the rearview mirror assembly, so as to eliminate the need for the end manufacturer to run and connect any such coaxial cable. Further, the mounting of the microwave antenna and receiver circuit in the same vehicle accessory,assembly also allows for the system to be readily retrofit or installed by an auto dealer. For example, if the microwave antenna is mounted in the housing of an exterior rearview mirror as disclosed in WO 97/21127, the microwave receiver circuit is preferably mounted in the same housing thereby eliminating the need for running expensive coaxial cable therebetween.

2. Vehicle and Vehicle Accessory Electrical Control System

Having described the preferred mechanical mounting structure and preferred microwave antenna construction, a preferred electrical control system 100 is described below with reference to FIGS. 6 and 7. Electrical control system 100 includes a microprocessor 110 that is interconnected to various components as described below, and programmed to perform various monitoring and control functions as also described in more detail below.

The present invention generally includes a microwave antenna 50 coupled to a receiver circuit 80 via a connector 84. As shown in FIG. 6, receiver circuit 80 includes an RF circuit 112 and a correlator 114, which may be constructed using conventional GPS or general microwave receiver circuitry (no correlator need be used in a general purpose receiver). The informational signal obtained from any satellite transmissions received by antenna 50 are thus processed by receiver circuit 80 and supplied to microprocessor 110 via line 85. As used and described herein, the term "microwave receiver" shall refer to microwave antenna 50 and receiver circuit 80. The microwave receiver is labeled with reference number 115.

When microwave antenna 50 is tuned to receive satellite transmissions from GPS satellites, receiver 115 receives and supplies to microprocessor 110 data identifying the satellites from which transmissions are received, as well as a clock signal from each of the different satellites. In a manner well known in the art, microprocessor 110 may process this data to identify the position of the vehicle in terms of its latitude, longitude, and altitude. Insofar as clock signals are received from the various satellites, receiver 115 also serves as a source of a clock signal that may be used to determine the time of day. Further, insofar as the information obtained from receiver 115 may be used to calculate the vehicle's change of position over time, receiver 115 also serves as a source of data from which the vehicle velocity and distance of travel may be ascertained.

If, on the other hand, microwave antenna 50 is tuned to receive signals from one or more CD radio satellites, microwave receiver 115 serves as a source of a CD quality satellite radio broadcast transmission, which may then be supplied to an audio system 162 (FIG. 7) via a discrete connection provided through discrete connection interface 118. As yet another alternative, microwave receiver 115 could supply its audio signal directly to the vehicle audio system without first supplying it through microprocessor 110. The audio or other data may also be transmitted via an infrared or low power RF link. Audio could be transmitted directly to the vehicle's radio from the mirror on a vacant channel with a low power transmitter. This would be particularly useful in after market and retrofit applications.

As discussed above, microwave receiver 115 may be configured such that microwave antenna 50 receives signals from both GPS satellites and CD radio satellites, in which case microwave receiver 115 would serve as a source of a wide variety of information and audio signals. Moreover, to the extent that microwave receiver 115 could be tuned to receive satellite transmissions from other communication satellites, such information may be passed to microprocessor 110 and displayed on a display 45 or other displays 166 (FIG. 7) connected to vehicle bus 117. Additionally, such information, if provided as a GPS or audio signal, may be transmitted to audio system 162 as described above with respect to CD radio signals. Further still, such information may be simply used and processed by microprocessor 110 or otherwise transmitted by radio frequency (RF) or infrared (IR) signals to other vehicle components or non-vehicle devices via transmitter 134. The information transmitted may be derived from either the microwave receiver or vehicle bus. Information derived from the vehicle bus may be particularly useful for trouble shooting and diagnostic purposes. Transmission of diagnostic data would typically be activated by a special vehicle start up sequence such as holding a radio or mirror button or buttons depressed while starting the vehicle.

Figure 6:
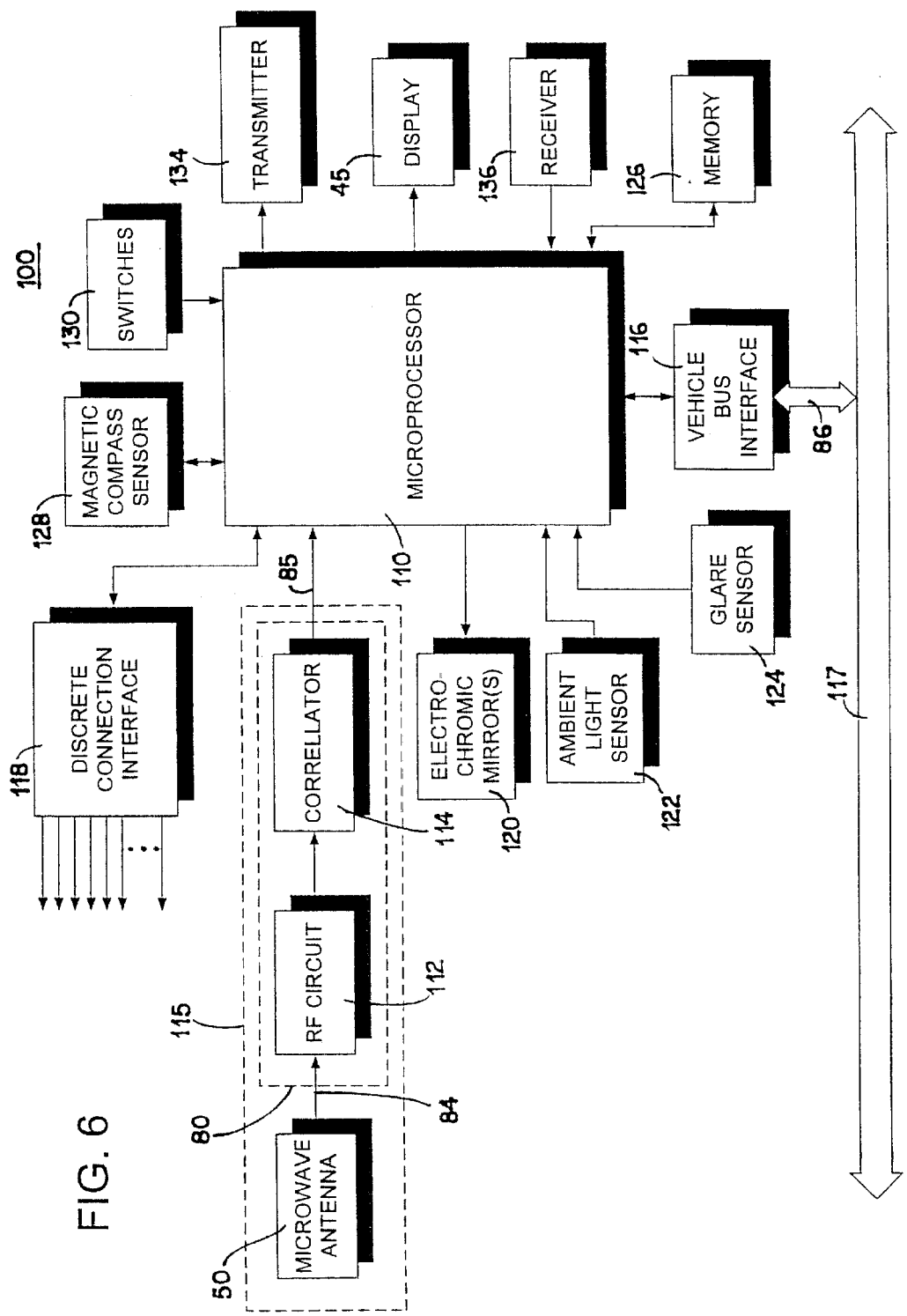
FIG. 6 is an electrical diagram in block form showing an electrical control system constructed in accordance with the present invention.

As shown in FIG. 6, microprocessor 110 may optionally be connected to one or more electrochromic mirrors 120. Specifically, when microwave receiver 115 is mounted in an interior rearview mirror assembly, microprocessor 110 is preferably coupled at least to the interior electrochromic mirror and optionally to external electrochromic mirrors 144, which may be coupled thereto by discrete connection or via vehicle bus 117. As will be described in more detail below, microprocessor 110 may be programmed to change the reflectivity of the electrochromic mirror(s) 120, 144 in response to information obtained from an ambient light sensor 122, a glare sensor 124, as well as any of the other components coupled to microprocessor 110 either directly or through vehicle bus 117. As well known in the art, ambient light sensor 122 is preferably mounted in a mirror housing of a rearview mirror assembly in a forward-looking location so as to be exposed to the light conditions in front of the vehicle, whereas glare sensor 124 is typically mounted in mirror housing 30 in a rearward-facing position so as to sense glare from head lamps of vehicles behind the vehicle. The detailed manner by which microprocessor 110 may control electrochromic mirror(s) 120 is described below under the heading "Electrochromic Mirror Control System."

Electrical control system 110 may also include a memory device 100 coupled to microprocessor 110. Memory device 126 may be external to microprocessor 110 or internal, depending upon the need for additional memory. Memory 126 may be volatile or non-volatile also depending upon the various components that are utilized in the electrical control system. For example, if the vehicle is equipped with an electronic compass 128 also provided in the rearview mirror assembly, some of the memory 126 would preferably be in the form of non-volatile memory so as to store calibration data accumulated by compass 128 and processed by microprocessor 110.

Figure 5:
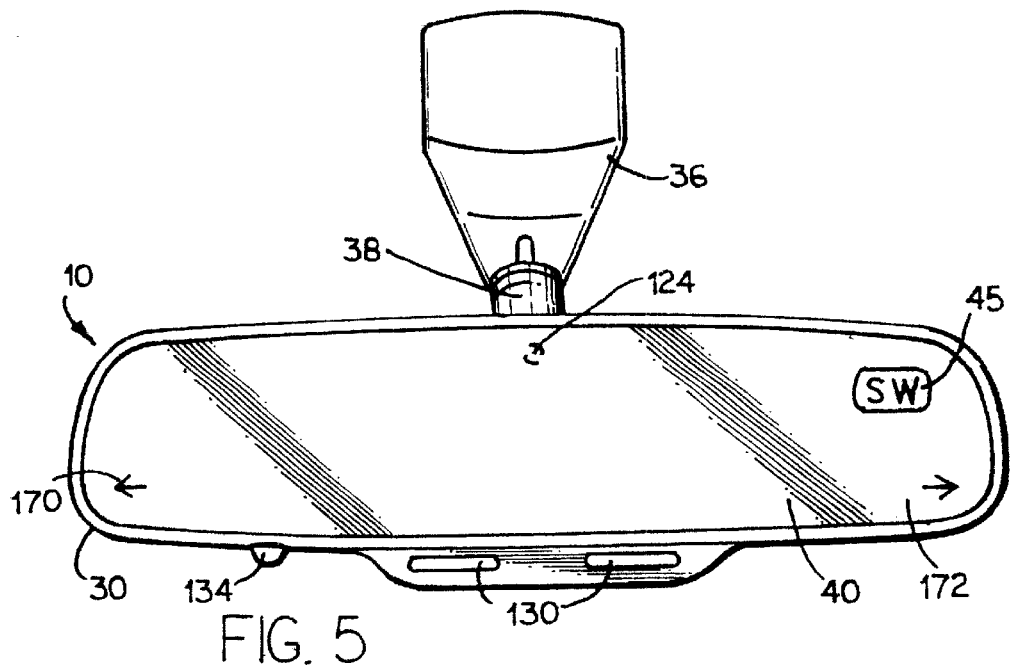
FIG. 5 is a rearward perspective view of the rearview mirror assembly constructed in accordance with the first embodiment of the present invention.

As shown in FIG. 5, rearview mirror assembly 10 may include a plurality of user-actuated switches 130 that provide user input information to microprocessor 110. Such switches may cause microprocessor 110 to change information displayed on display 132 or to deactivate the electrochromic mirrors 120, to name just but a few functions that may be affected through user actuated switches.

As will be explained in further detail below, electrical control system 100 may include a transmitter 134, preferably an IR transmitter, for transmitting an IR signal into the interior passenger area of the vehicle. This IR signal may include any data or other information intended for portable electronic devices that may be located in the passenger area.

Electrical control system 100 may also include a receiver 136 intended to receive RF signals or the like, from remotely located transmitters such as a remote keyless entry (RKE) transmitter or tire pressure monitoring sensors, as will be explained in more detail below.

As will become apparent to one skilled in the art from the description of the various functions below, electrical control system 100 may include various combinations of the elements identified above and shown in FIG. 6, and thus need not include each and every element described above. Further, although each of the elements shown in FIG. 6 may be housed within rearview mirror assembly 10, some or all of the components may be provided in other remote locations and transmit and receive information from microprocessor 110 over vehicle bus 117. Further, the various components that may be mounted in rearview mirror assembly 10 may be mounted in either mounting foot 36 or mirror housing 30 with appropriate electrical connections made therebetween.

Figure 7:
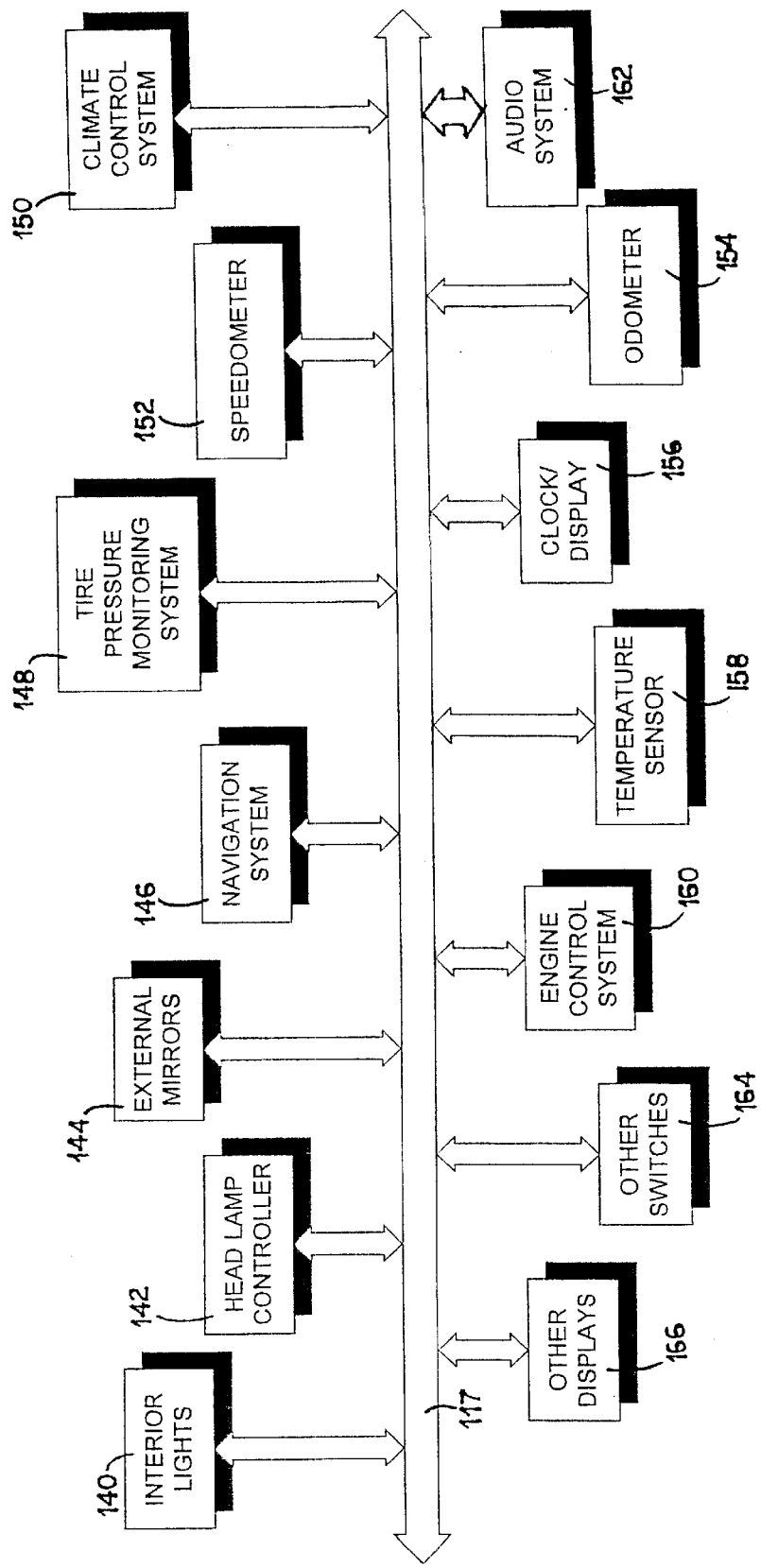
FIG. 7 is an electrical diagram in block form showing various electrical systems that may be coupled to the inventive electrical control system shown in FIG. 6.

FIG. 7 shows an example of some systems and other electrical devices within the vehicle that may be connected to vehicle bus 117, and hence in electrical communication with microprocessor 110 and the various components that are connected to microprocessor 110. Specifically, the following are a few examples of the components that may be coupled to vehicle bus 117: interior lights 140, head lamp controller 142, external rearview mirrors 144, navigation system 146, tire pressure monitoring system 148, climate control system 150, speedometer 152, odometer 154, clock/display 156, temperature sensor 158, engine control system 160, audio system 162, and various other switches 164 and other display devices 166 that may be located throughout the vehicle. The specific manner by which microprocessor 110 interacts with the components shown in FIG. 7 is described below.

A. Electrochromic Mirror Control System

Electrochromic rearview mirrors are known in the art which have a reflectivity that is automatically varied based upon light levels sensed by a rearward-facing glare sensor and a forward-facing ambient light sensor. In general, the advantages offered by such electrochromic mirrors are to prevent the light reflected from the mirrors from greatly exceeding the light levels the driver sees from the front of the vehicle. For example, at nighttime a driver's eyes would become acclimated to relatively low light levels, and thereby be much more sensitive to the light emitted from a vehicle's head lamps to the rear of the vehicle that is reflected off the mirrors towards the driver's eyes. Such a head lamp glare not only is a nuisance, but may also adversely impact the driver's night vision. On the other hand, during daylight hours the light from a rearward vehicle's head lamps would present much less of a problem, since the driver's eyes are already acclimated to bright light, and therefore, it is not desirable to darken the mirrors and lower their reflectivity in such circumstances. It is therefore the primary objective of the control system for such electrochromic mirrors to maintain a reflected level of light to the driver's eyes that is no greater than, and approximately the same as, the light levels seen by the driver in the forward direction of the vehicle.

Electrochromic mirrors and control systems for those electrochromic mirrors are well known in the art and are described in U.S. Pat. No. 4,902,108, entitled "SINGLE-COMPARTMENT, SELF-ERASING, SOLUTION-PHASE ELECTROCHROMIC DEVICES SOLUTIONS FOR USE THEREIN, AND USES THEREOF," issued Feb. 20, 1990, to H. J. Byker; Canadian Patent No. 1,300,945, entitled "AUTOMATIC REARVIEW MIRROR SYSTEM FOR AUTOMOTIVE VEHICLES," issued May 19, 1992, to J. H. Bechtel et al.; U.S. Pat. No. 5,128,799, entitled "VARIABLE REFLECTANCE MOTOR VEHICLE MIRROR," issued Jul. 7, 1992, to H. J. Byker; U.S. Pat. No. 5,202,787, entitled "ELECTRO-OPTIC DEVICE," issued Apr. 13, 1993, to H. J. Byker et al.; U.S. Pat. No. 5,204,778, entitled "CONTROL SYSTEM FOR AUTOMATIC REARVIEW MIRRORS," issued Apr. 20, 1993, to J. H. Bechtel; U.S. Pat. No. 5,278,693, entitled "TINTED SOLUTION-PHASE ELECTROCHROMIC MIRRORS," issued Jan. 11, 1994, to D. A. Theiste et al.; U.S. Pat. No. 5,280,380, entitled "UV-STABILIZED COMPOSITIONS AND METHODS," issued Jan. 18, 1994, to H. J. Byker; U.S. Pat. No. 5,282,077, entitled "VARIABLE REFLECTANCE MIRROR," issued Jan. 25, 1994, to H. J. Byker; U.S. Pat. No. 5,294,376, entitled "BIPYRIDINIUM SALT SOLUTIONS," issued Mar. 15, 1994, to H. J. Byker; U.S. Pat. No. 5,336,448, entitled "ELECTROCHROMIC DEVICES WITH BIPYRIDINIUM SALT SOLUTIONS," issued Aug. 9, 1994, to H. J. Byker; U.S. Pat. No. 5,434,407, entitled "AUTOMATIC REARVIEW MIRROR INCORPORATING LIGHT PIPE,"

issued Jan. 18, 1995, to F. T. Bauer et al.; U.S. Pat. No. 5,448,397, entitled "OUTSIDE AUTOMATIC REARVIEW MIRROR FOR AUTOMOTIVE VEHICLES," issued Sep. 5, 1995, to W. L. Tonar; and U.S. Pat. No. 5,451,822, entitled "ELECTRONIC CONTROL SYSTEM," issued Sep. 19, 1995, to J. H. Bechtel et al. While the control systems utilized in such electrochrornic mirror systems are generally effective, such control systems may nevertheless be further improved by reducing their susceptibility to variations in ambient light levels that may be sensed by the forward-facing ambient light sensor. For example, lights from spaced-apart streetlights may cause the control system to periodically change the reflectivity of the mirror each time it passes under a streetlight. While some of the above patents disclose control systems that average readings from the ambient light sensor so as to reduce the system's responsiveness to such changes in ambient light levels, such systems typically use a fixed time average, which may or may not be of sufficient duration so as to prevent the mirror reflectivity from being changed in response to periodic changes such as those introduced by streetlights or head lamps of oncoming traffic.

It is also important to ensure that any external electrochromic mirrors are not darkened during daylight hours because electrochromic mirrors are susceptible to irreversible damage when exposed to ultraviolet (UV) radiation when in a darkened, less reflective state. Because a control system may be tricked into believing that it is nighttime and that the external electrochromic mirrors may be darkened when the vehicle has merely gone under an overpass, entered a tunnel, or when the sun is obscured by some other obstructions, it is possible that the external electrochromic mirrors could be exposed to harmful UV radiation from the sun when the obstruction is moved or when the vehicle moves relative to the obstruction so that the sunlight once again strikes the vehicle's external mirrors.

Accordingly, it is an aspect of the present invention to provide a control system that overcomes some of the problems experienced by prior art control systems. Specifically, it is an aspect of the present invention to provide additional information to a control circuit for an electrochromic mirror, with which the control circuit can make better decisions how to darken the mirror. To achieve these and other aspects and advantages, an electrochromic rearview mirror system constructed in accordance with the present invention preferably includes a control circuit adapted to be coupled to a source of a clock signal and being configured to determine whether it is daytime or nighttime based upon the clock signal received from the clock source. The control circuit being further configured to generate and supply a reflectivity control signal to the electrochromic mirror(s) 120 to thereby control the reflectivity of the electrochromic mirror(s), whereby the control circuit controls the reflectivity differently in response to light levels sensed by the glare sensor 124 when the control circuit determines that it is nighttime. Further, the electrochromic rearview mirror system preferably includes a microwave receiver 115 for receiving signals from satellites in the sky over the vehicle to thereby track the location of the satellites relative to the vehicle and monitor the presence or absence of a signal received from each of the satellites. The control circuit is coupled to the microwave receiver and is configured to determine what portions of the microwave receiver's view of the sky over the vehicle are blocked by a potentially light blocking/filtering obstruction based upon a determination of whether a signal is or is not being received from one or more of the satellites. The control circuit may then control the reflectivity of the electrochromic mirror(s) as a function of the light level sensed by the glare sensor and the portions of the sky above the vehicle that are potentially obstructed by a light blocking/filtering structure.

The electrochromic rearview mirror system of the present invention may also be implemented according to another aspect by coupling the control circuit to a source of vehicle velocity data and configuring the control circuit to control the reflectivity of the electrochromic mirror(s) differently in response to light levels sensed by the glare sensor depending upon the velocity of the vehicle as determined from the vehicle velocity data.

Figure 8A:
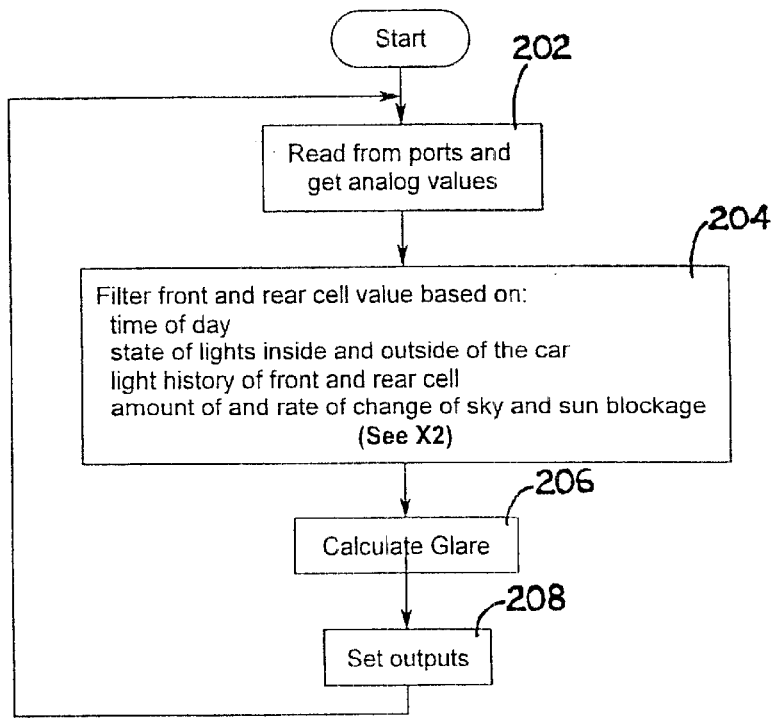
FIGS. 8A and 8B are flowcharts illustrating the process performed for an inventive electrochromic mirror control process.
Figure 8B:
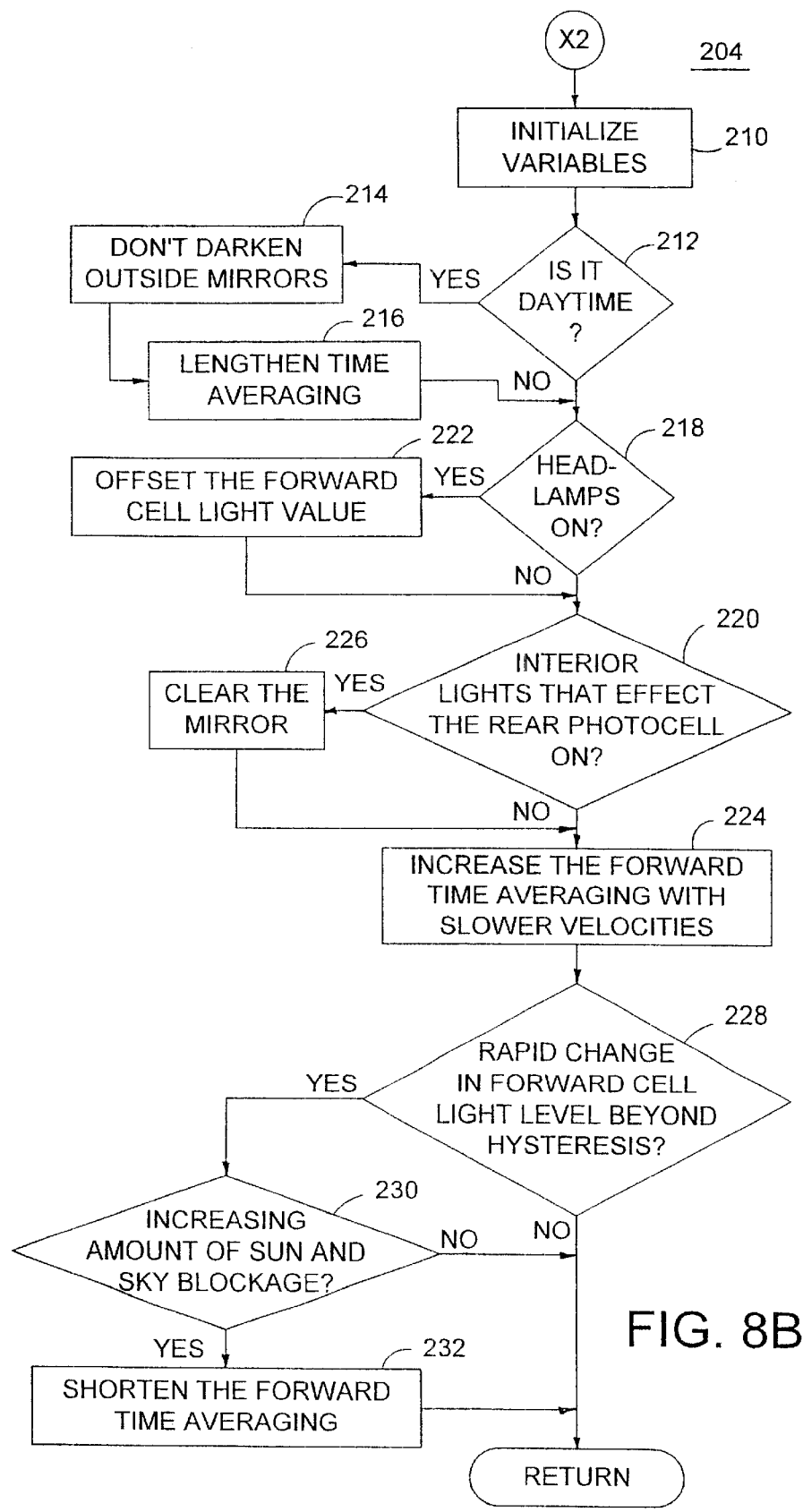

Preferably, the control circuit referenced above includes microprocessor 110 (FIG. 6), which is programmed to perform the functions outlined generally in the flowcharts shown in FIGS. 8A and 8B.

FIG. 8A shows the general control loop 200 that microprocessor 110 performs in controlling electrochromic mirror (s) 120. Control loop 200 begins with microprocessor 110 reading the analog voltage levels applied to its ports by ambient light sensor 122 and glare sensor 124. Ambient light sensor 122 and glare sensor 124 may be implemented with photo cells that vary their output voltage level directly or indirectly in response to the light levels they are currently sensing. Next, in step 204, microprocessor 110 filters the ambient and glare sensor output values based on the time of day, the on and off state of the lights inside the vehicle, the on and off state of the head lamps of the vehicle, light history of the ambient and glare sensors, and the amount and rate of change of sky and sun blockage. The specific manner by which microprocessor 110 filters these values in step 204 is described in more detail below with reference to FIG. 8B.

Once microprocessor 110 has filtered the values received from sensors 122 and 124, it calculates a glare value in step 206 by generally comparing the filtered ambient light level to the filtered glare level. Next, in step 208, microprocessor 110 adjusts the level of the reflectivity control signal(s) applied to electrochromic mirror(s) 120. Microprocessor 110 then loops back to step 202 to again read the values of sensors 122 and 124, and continues to loop through steps 202 to 208 to continuously monitor the sensed light levels and control the reflectivity of the electrochromic mirror(s).

FIG. 8B shows the general process by which microprocessor 110 performs the filtering steps outlined in step 204 of FIG. 8A. As shown in FIG. 8B, microprocessor 110 starts the filtering process in step 210, whereby it initializes variables that are utilized in the subsequent steps. Microprocessor 110 then determines whether it is daytime in step 212. Microprocessor 110 may determine whether it is daytime based upon a clock signal it receives from one of a variety of possible sources of such a clock signal. The clock signal may be delivered to microprocessor 110 via the vehicle's clock 156 or may be supplied by an internal clock within microprocessor 110. Preferably, however, the source of the clock signal is microwave receiver 115, which receives such a clock signal from the satellites of a position identification system. Microwave receiver 115 is preferred since it also provides information from which the vehicle's current position may be determined. Such vehicle position information may then be used to access a look-up table to determine what time zone the vehicle is in and to determine the daylight hours for the vehicle's current position for that particular time of year. Thus, microprocessor 110 may determine whether it is daytime at the vehicle's current location without having to rely upon the ambient light levels sensed by ambient light sensor. 122, which may not accurately reflect whether or not it is daytime. For example, the vehicle may be parked in a well lit parking ramp at nighttime, or the vehicle may be parked in a dimly lit garage during the daytime.

If microprocessor 110 determines that it is daytime in step 212, it sets a flag so as to not darken the external electrochromic mirrors 144 regardless of the light levels sensed by ambient light sensor 122 or glare sensor 124. Thus, if the vehicle is parked in a dimly lit garage during the daytime, the external mirrors cannot be darkened and thus can not be damaged when the driver moves the vehicle out of the garage into the direct sunlight. Conversely, the external rearview mirrors will be allowed to be darkened when it is not daytime despite the fact that the vehicle may be located in a well lit parking ramp, where head lamps on vehicles to the rear may otherwise be a nuisance to the driver. It should be noted however, that the microprocessor could nevertheless be programmed to allow the external electrochromnic mirrors to be darkened during daylight hours particularly if improvements are made to electrochromic mirrors that make them less susceptible to damage from UV radiation. In such a case, the microprocessor could be programmed to change the way it filters the data it uses to control the darkening of the mirrors during daylight. For example, the microprocessor could lengthen the time period during which the ambient light levels are averaged during daylight hours. Alternatively, the thresholds used to determine the extent to which the mirrors are to be darkened could be changed based upon a determination of whether it is day or night.

In addition to preventing the outside rearview mirrors from becoming darkened when it is daytime, microprocessor 110 also lengthens the time period during which the output of forward facing ambient light sensor 122 is averaged when it is daytime (step 216). By lengthening the time period during which the ambient light level is averaged during daytime, microprocessor 110 will be less likely to overreact to a sudden darkening of the ambient light level as would be the case when the vehicle travels or is stopped under an overpass or under some other obstruction, such as a dense tree or other light-blocking obstruction.

If microprocessor 110 determines in step 212 that it is not daytime, or if microprocessor 110 determines that it is daytime and has performed steps 214 and 216, microprocessor 110 then determines whether the head lamps of the vehicle are on in step 218. Microprocessor 110 may determine whether the head lamps are on by communicating with a head lamp controller 142 via bus 117, or it may be able to determine if the head lamps are on if microprocessor 110 is configured to automatically control the head lamps as discussed below under the next heading.

If the vehicle head lamps are not on, microprocessor 110 proceeds to execute step 220, otherwise microprocessor 110 first offsets the sensed ambient light value by a predetermined amount so as to account for the fact that the sensed ambient light level is artificially higher as a result of the light produced by the head lamps.

In step 220, microprocessor 110 checks whether there are any interior lights that are on that would affect the light level sensed by the rearward-facing glare sensor 124. If there are no interior lights on, microprocessor 110 proceeds to step 224. If microprocessor 110 determines that there are interior lights that are on, it first clears the electrochromic mirror(s) in step 226 prior to proceeding to step 224. Microprocessor 110 clears the mirrors in this instance so as to maximize the reflectivity, since interior lights that are turned on during nighttime already make it difficult to see outside the vehicle let alone if the reflectivity of the mirrors are substantially reduced in response to the artificial light levels sensed by glare sensor 124.

In step 224, microprocessor 110 monitors the velocity of the vehicle and increases the time period during which the ambient light level is averaged with slower vehicle velocities. Microprocessor 110 receives data from which the vehicle velocity may be ascertained from a source of data that may include the vehicle speedometer 152 or microwave receiver 115. Microprocessor 110 utilizes vehicle velocity to vary the control of the electrochromic mirrors, since the electrochromic mirror control system of a vehicle traveling slowly under spaced-apart streetlights or in the face of oncoming traffic would otherwise be more susceptible to those changes in light level than would that of a vehicle traveling at a higher velocity that is exposed to those same lighting conditions. More specifically, the electrochromic mirror control system of a vehicle that is either stopped or moving very slowly beneath a streetlight would otherwise sense a relatively high level of ambient light over a sufficiently long period for microprocessor 110 to determine that it is relatively light outside, whereas a car that is quickly moving underneath the same streetlight would not be as significantly impacted by the sensing of the streetlight.

Referring back to FIG. 8B, microprocessor 110 next performs step 228, whereby it determines whether there is a rapid change in the sensed ambient light level beyond a threshold level established by a stored hysteresis. If there is no rapid forward change, microprocessor 110 simply returns to the main control loop and performs steps 206 and 208. If microprocessor 110 determines that there has been a rapid change in the sensed ambient light level, it determines in step 230 whether there is an increasing amount of sun and sky blockage. If microprocessor 110 determines that there is not an increasing amount of sun and sky blockage, it returns to the main control loop and executes steps 206 and 208. If the amount of sun and sky blockage is increasing, microprocessor 110 first shortens the time period during which the ambient light level is averaged in step 232 prior to returning to step 206 of the main control loop.

Microprocessor 110 preferably determines whether there is an increasing amount of sun and sky blockage based upon information obtained by microwave receiver 115 from the GPS satellite constellation. The GPS constellation is a group of satellites that are in roughly 12-hour orbits, inclined 55° from the Equator, spaced every 60° around the Earth. Every satellite is constantly sending data that indicates where all the other satellites are in the sky. Thus, once microwave receiver 115 locks onto one satellite, it knows where to look for all the other satellites of the constellation. In an ideal situation, microwave antenna 50 can "see" the whole sky and receive data from every satellite in view of the antenna. However, the vehicle may be located where microwave antenna 50 cannot "see" part of the sky. For example, the GPS signals will not penetrate or go around most buildings. The satellites that are behind these buildings cannot be "seen" by microwave antenna 50, and microwave receiver 115 cannot get data from them. Thus, the fact that a satellite is up in the sky but cannot be "seen" at a given time is useful information that may be taken into account when controlling the reflectivity of the electrochromic mirror(s). Specifically, there typically has to be a reason a satellite that is up in the sky cannot be detected. For example, metal objects usually block the GPS signal. Most buildings, tunnels, bridges, etc., will block GPS signals. The information that these objects are there can be used as will be described below. For example, a vehicle's climate control system may use the information to determine where the sun is, how it is hitting the car, and if the sun is blocked by an object. Such sun load sensing is now commonly performed with multiple IR sensors. By using GPS data in combination with a single IR sensor, equivalent or better sun load sensing performance could be obtained at less cost in a GPS equipped vehicle. For electrochromic mirror control as well as head lamp control, the combination of ambient light information and object detection produces a more robust control algorithm.

Microprocessor 110 may thus be programmed to store the position information of each of the satellites from which receiver 115 receives such a signal, and then may compare this information to the signals it later receives so as to determine whether there may be an obstruction that is preventing reception of a signal from one of the satellites. For example, as a vehicle approaches an overpass, a progression of the satellites in the portion of the sky in front of the vehicle will have their signals blocked by the upcoming overpass, but will progressively reappear as the vehicle approaches and travels under the overpass. Microprocessor 110 may thus monitor the presence or absence of signals received from the various satellites in the sky over the vehicle and store their history, so as to ascertain whether there are any obstructions in any particular portion of the sky that may affect the ambient light levels sensed by ambient light level sensor 122. Thus, if microprocessor 110 determines in step 228 that there is a rapid change in the light level detected by sensor 122 and that there is an increasing amount of sun and sky blockage based upon the history of signals received from the satellites in the sky overhead, microprocessor 110 may determine that the rapid change in light level was caused by a temporary light blocking/filtering obstruction and then control the reflectivity of the electrochromic mirrors accordingly.

If, on the other hand, the amount of sun and sky blockage does not suggest that the rapid change in ambient light level is the result of a temporary blockage, but is the result of an approaching larger blockage, microprocessor 110 would shorten the time period in which the ambient light is averaged so as to increase the responsiveness of the control system to increases in light levels sensed by glare sensor 224. Microprocessor 110 may determine that the amount of sky blockage is increasing by determining that more and more of the signals from the satellites are being blocked and not subsequently received despite the movement of the vehicle. Such sky blockage may be indicative of an approaching mountain range, tunnel, tall buildings, or a parking ramp, because such increasing sky and sun blockage would indicate that the rapid drop in ambient light level is not subsequently going to rapidly increase.

While the above system is described as detecting either the absence or presence of signals from the satellites to determine sky blockage, it is possible to determine sky blockage by detecting the strength of the signals from the satellites.

As apparent from the above description, the inventive electrochromic mirror control system controls the reflectivity of the electrochromic mirror(s) in response to parameters not previously considered for electrochromic mirror control. Because some of the parameters relied upon in the inventive system may be obtained from vehicle components other than microwave receiver 115, it will be appreciated by those skilled in the art that the inventive electrochromic mirror control system may be implemented without utilizing microwave receiver 115, although certain features of the present invention relating to determining sky blockage would not then be available.

Although the preferred mounting for microwave antenna 50 and microwave receiver circuit 80 has been described above as being in the mounting foot of a rearview mirror assembly, microwave receiver 115 may be mounted in any other location within the vehicle, and the data utilized by microprocessor 110 in controlling electrochromic mirror(s) 120 may be obtained through vehicle bus 117 or through a discrete connection. As will also be appreciated by those skilled in the art, the inventive electrochromic mirror control system may be implemented without use of components other than electrochromic mirror(s) 120, ambient light sensor 122, glare sensor 124, microprocessor 110, and optionally microwave receiver 115.

B. Head Lamp Control System

Vehicle electrical control systems are known that automatically control the vehicle's head lamps in response to sensed ambient light levels. Such head lamp control systems have typically been incorporated in rearview mirrors since the rearview mirror assembly provides a convenient location for mounting a photocell that is pointed at the sky to measure ambient light. The reason rearview mirror assemblies are used for such mounting is that it provides an unobstructed view of the sky and is not subject to blockage by papers, etc . . . as when the sensor is in the dash.

Head lamp control systems suffer from many of the same problems of conventional electrochromic mirror control systems insofar as they both rely upon the light levels sensed by a single forward-facing ambient light sensor. As with electrochromic mirror control systems, head lamp control systems may be fooled into believing it is daylight when parked or traveling slowly under a streetlight or parking ramp, while also being fooled into believing it is nighttime when parked in the shadow of a light-obstructing structure. To avoid turning the head lamps on and off, the detected ambient light level is often filtered/averaged over a time period. However, such averaging and filtering does not always reliably control the head lamps.

Therefore, it is an aspect of the present invention to provide a head lamp control system that more reliably controls the head lamps. The head lamp control system of the present invention achieves this aspect and other advantages by controlling the head lamps not only in response to light levels sensed by an ambient light sensor, but also in response to the amount of sky blockage, the vehicle velocity, and/or a clock signal that identifies the time of day. With reference to FIGS. 6 and 7, the head lamp control system of the present invention preferably includes microprocessor 110, ambient light sensor 122, and a connection of microprocessor 110 to the head lamps or a head lamp controller or control switch 142. As generally known in the art, ambient light sensor 122 is typically a separate sensor from the ambient light sensor used to control an electrochromic mirror. The system also preferably includes a microwave receiver 115 coupled to microprocessor 110 for providing information from which the vehicle velocity, time of day, and amount of sky blockage may be determined. The head lamp control system may, but need not, include any of the other components shown in FIGS. 6 and 7. As an alternative or additional element to microwave receiver 115, microprocessor 110 may include a connection to the vehicle speedometer 152 and/or the vehicle clock/display 156. Having described the general structure of the head lamp control system, the inventive control process is described below with reference to FIGS. 9A through 9C.

Figure 9A:
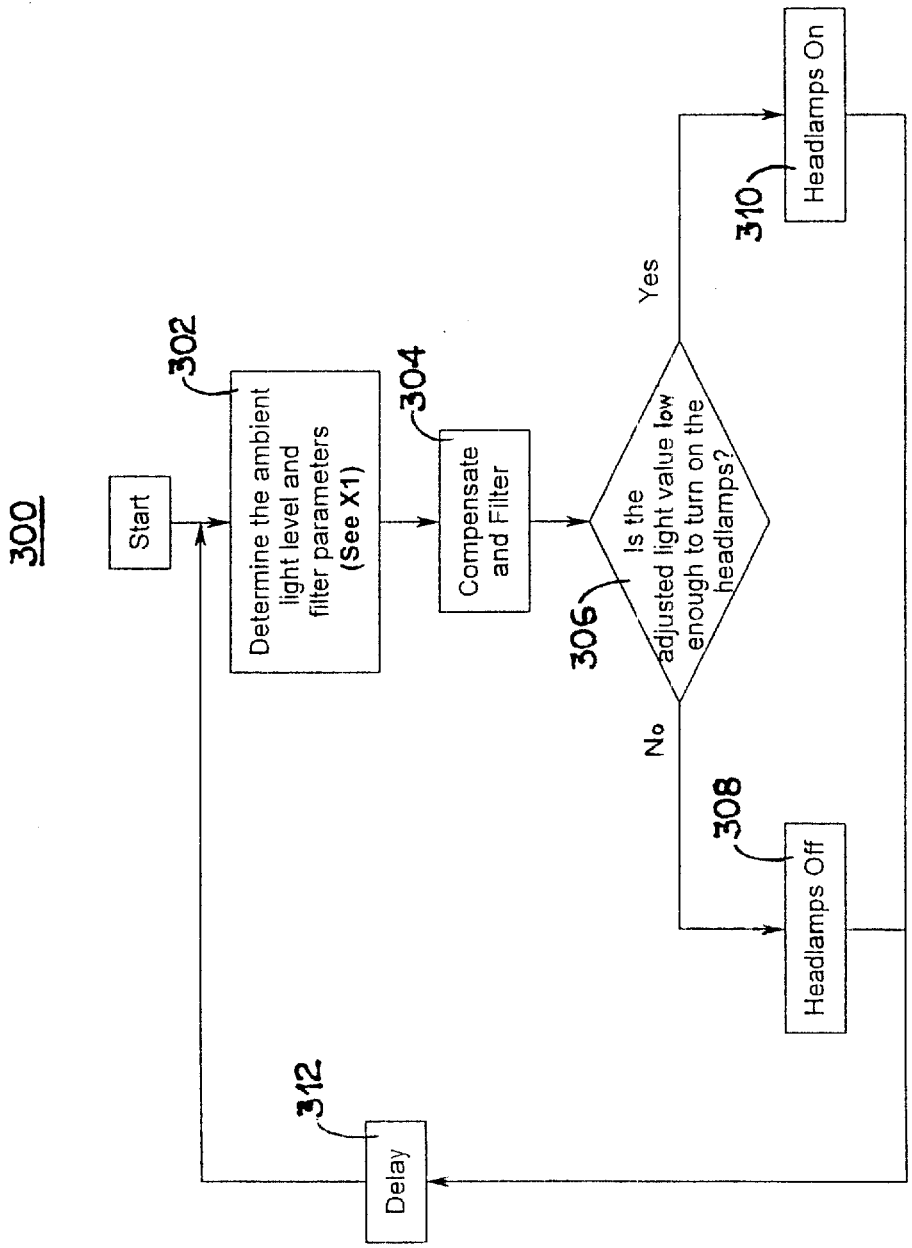
FIGS. 9A–9C are flowcharts illustrating the inventive process performed by the electrical control system to control the head lamps of a vehicle.

FIG. 9A shows the main control loop 300 executed by microprocessor 110 to control the head lamps of the vehicle. Control loop 300 begins in step 302 in which microprocessor 110 determines the ambient light level and filter parameters in accordance with the subroutine procedures outlined in FIGS. 9B and 9C. Subsequently, microprocessor 110 compensates and filters the sensed ambient light level in step 304 and then compares the filtered and compensated ambient light level to a threshold, so as to determine whether the sensed and adjusted ambient light level is low enough to turn on the head lamps. If the light level is not low enough, microprocessor 110 turns the head lamps off in step 306 or otherwise maintains the head lamps in their off state. On the other hand, if the sensed and adjusted ambient light level is low enough, microprocessor 110 issues a signal over bus 117 or another discrete connection to the head lamp controller 142 causing the head lamps to be turned on or otherwise maintained in their on state (step 310). Once microprocessor 110 has executed either step 308 or step 310, it loops back to reexecute steps 302 through 306 following a delay period established in step 312. Such a delay period may be terminated in response to an interrupt signal that is generated on a periodic basis to either wake up microprocessor 110 or otherwise interrupt another process performed by microprocessor 110. Moreover, delay 312 may simply correspond to the amount of time it takes for microprocessor 110 to perform other routines relating to control of an electrochromic mirror or other components in the vehicle.

Figure 9B:
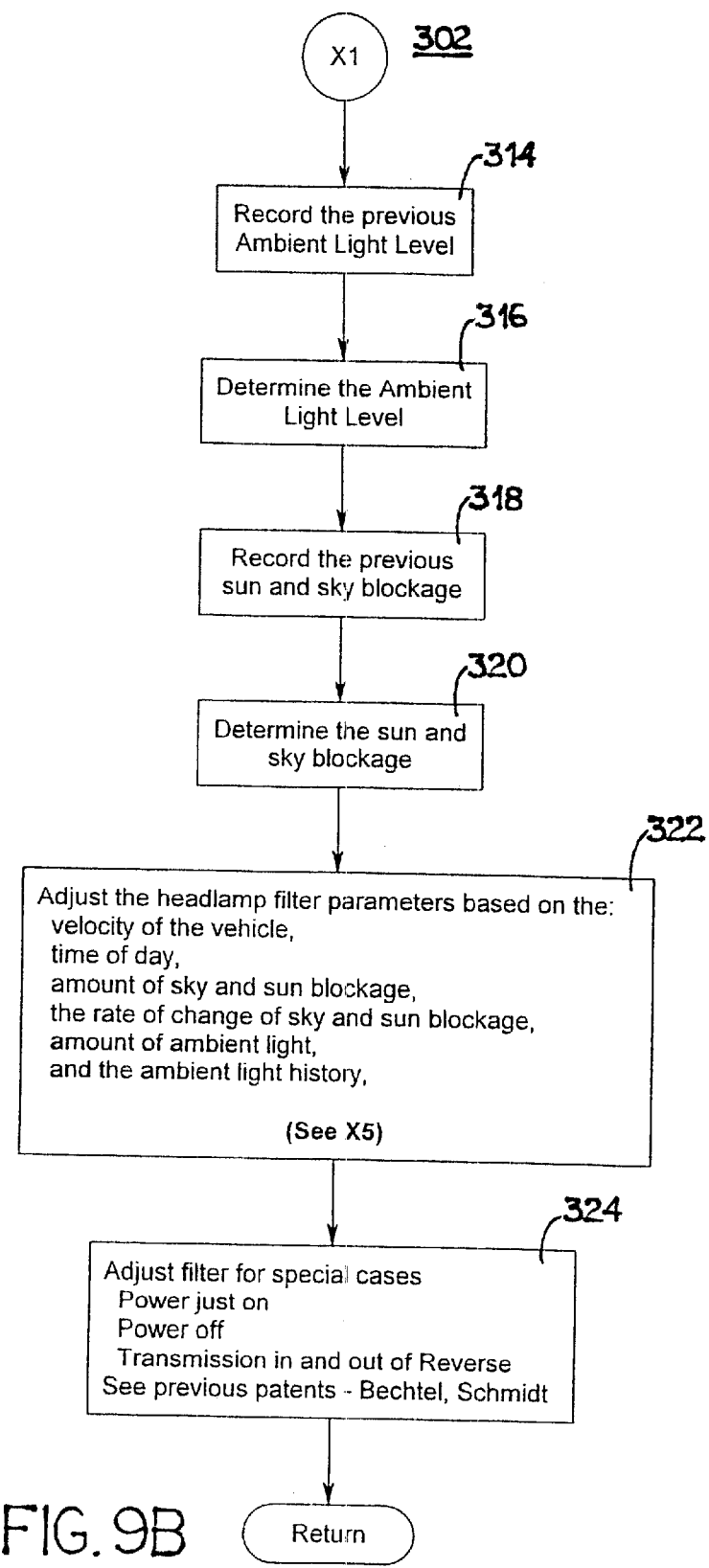

FIG. 9B shows the general process by which microprocessor 110 determines the ambient light level and the filter parameters in step 302. Microprocessor 110 begins this subroutine in step 314 by recording the previously sensed ambient light level and then determining the ambient light level currently sensed by ambient light sensor 122 (step 316). Microprocessor 110 then records the previous sun and sky blockage data in step 318 prior to proceeding to step 320 by which microprocessor 110 determines the current sun and sky blockage based upon information obtained from microwave receiver 115. As described above in the preceding section, microprocessor 110 may determine the amount of sun and sky blockage by keeping track of the history of signals received from the satellites in the sky.

In step 322, microprocessor 110 adjusts the head lamp filter parameters based on the velocity of the vehicle, time of day, amount of sky and sun blockage, the rate of change of sky and sun blockage, amount of ambient light, and the ambient light history. The specific manner by which the filter parameters are adjusted is described below with reference to FIG. 9C. After executing step 322, microprocessor 110 adjusts the filter for special cases, such as a detection that power has just been turned on or off and whether the transmission is in or out of reverse gear. The specific manner by which the filter is adjusted for these special cases is disclosed in U.S. Pat. No. 5,666,028 issued to Bechtel et al. Subsequently, microprocessor 110 returns to step 304 of main control loop 300 and performs the functions described above.

Figure 9C:
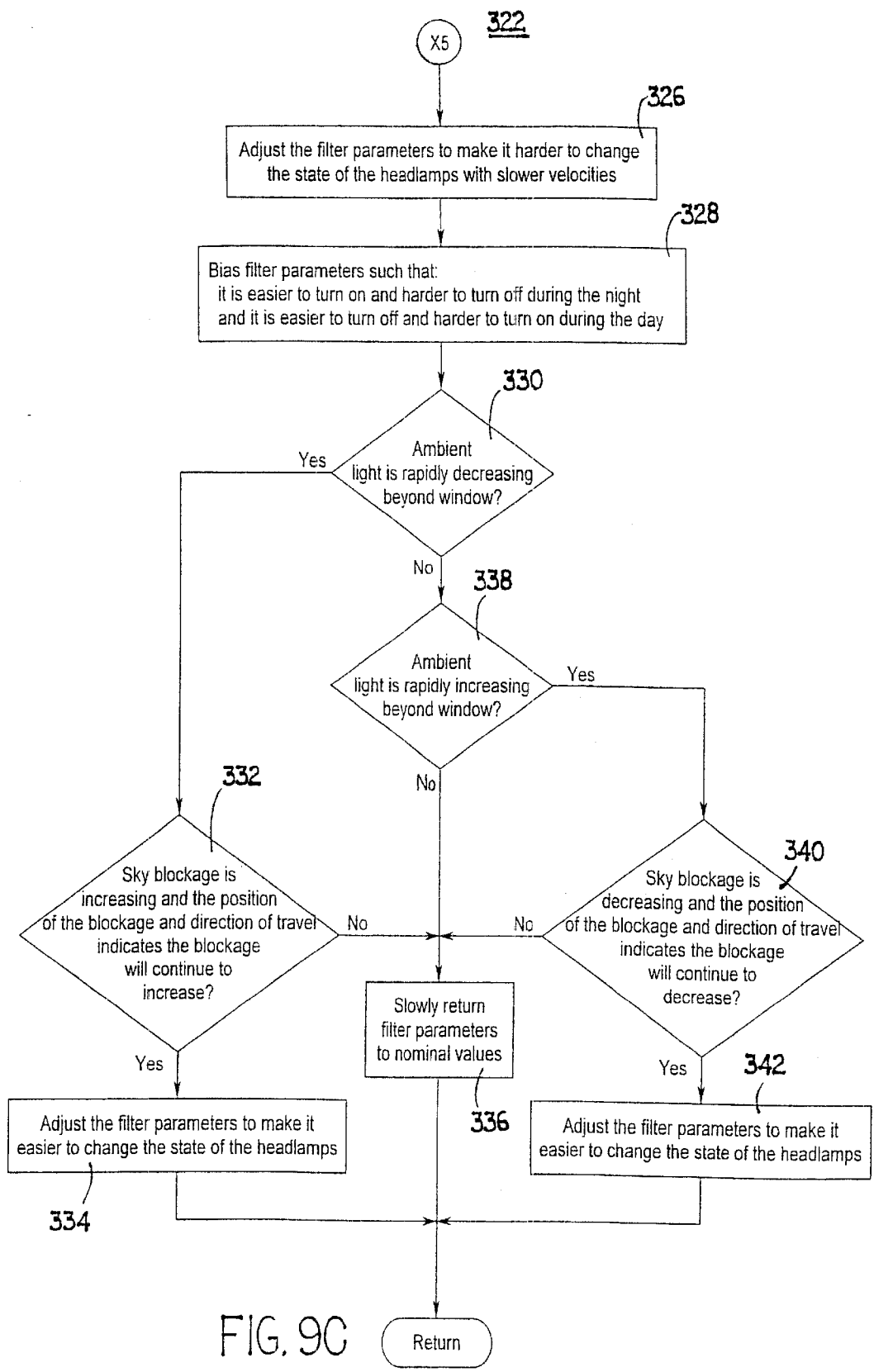

FIG. 9C shows the specific manner by which microprocessor 110 adjusts the head lamp filter parameters identified in step 322. Microprocessor 110 begins this subroutine in step 326 by adjusting the filter parameters to make it harder to change the state of the head lamps with slower vehicle velocities. More specifically, microprocessor 110 increases the time period during which the ambient light level is averaged with decreasing vehicle velocity. Thus, for example, a vehicle passing under a bridge during the day and a street light at night are anomalies that the algorithm should filter out. The velocity of the vehicle determines the time the vehicle spends by these anomalies, and therefore should influence the parameters of the averaging and filtering algorithm.

Next, in step 328, microprocessor 110 biases the filter parameters, such that it is easier to turn the head lamps on and harder to turn the head lamps off during nighttime and so that it is easier to turn the head lamps off and harder to turn the head lamps on during the day. As discussed above in the preceding section, microprocessor 110 may determine whether it is nighttime or daytime based upon a clock signal that represents the current time of day. This clock signal may be obtained from the vehicle clock 156 or from microwave receiver 115, which receives a clock signal from the satellites of a position identification system. As also discussed above, microprocessor 110 may access a look-up table or otherwise calculate the hours during which daylight is expected for the identified current location of the vehicle for the present time of year. Microprocessor 110 may thus use this information and the current time of day to determine whether it is currently daytime or nighttime.

After step 328, microprocessor 110 executes step 330 in which it determines whether ambient light is rapidly decreasing beyond a threshold window. If the ambient light is rapidly decreasing beyond the threshold window, microprocessor 110 executes step 332 in which it determines whether sky blockage is increasing and the position of the blockage in direction of travel indicates that the blockage will continue to increase. If the sky blockage is increasing and will continue to increase, microprocessor 110 adjusts the filter parameters to make it easier to change the state of the head lamps (step 334). If the sky blockage is not increasing or if it is increasing but will not continue to increase, such as the case of. when the vehicle is approaching an overpass, microprocessor 110 slowly returns the filter parameters to nominal values (step 336) prior to returning to step 324 of subroutine 302. The reason the filter parameters are adjusted in step 334 to make it easier to change the state of the head lamps when sky blockage is increasing and will continue to increase and when ambient light is rapidly decreasing is that it is likely that the vehicle is approaching a tunnel, in which case one would like the head lamps to respond more rapidly to the decrease in ambient light levels. On the other hand, if the decrease is caused only by a temporary blockage, such as an overpass, one would not want their head lamps to be turned on rapidly in response to the decrease in ambient light.

To allow a vehicle's head lamps to more rapidly turn off when emerging from a tunnel, microprocessor 110 may check in step 338 whether the ambient light is rapidly increasing beyond a threshold window. If the ambient light is neither rapidly decreasing (step 330) nor rapidly increasing (step 338), microprocessor 110 executes step 336, whereby it slowly returns filter parameters to nominal values and returns to step 324 (FIG. 9B). On the other hand, if the ambient light is rapidly increasing beyond the threshold window, microprocessor 110 executes step 340, whereby it determines whether the sky blockage is decreasing and the position of the blockage and direction of travel indicates that the blockage will continue to decrease. If the sky blockage is not decreasing or is decreasing but will not continue to decrease, microprocessor 110 executes step 336 and slowly returns the filter parameters to nominal values prior to returning to step 324 (FIG. 9B). On the other hand, if the sky blockage is decreasing and will continue to decrease, microprocessor 110 adjusts the filter parameters to make it easier to change the state of the head lamps (step 342). Thus, if the vehicle is emerging from a tunnel, the ambient light would rapidly increase and the sky blockage would decrease and continue to decrease, such that microprocessor 110 would make it easier to turn the head lamps off upon emerging from the tunnel or other large obstruction. After executing one of steps 334 or 342, microprocessor 110 returns to step 324 to make further adjustments prior to executing step 304 and main control loop 300, whereby the ambient light levels are compensated and filtered using the parameters set in step 302 prior to determining whether or not to turn the head lamps on or off. The above-noted process is then continued indefinitely, so long as the vehicle is operating.

While a specific process is described above for controlling head lamps of a vehicle, it will be appreciated by those skilled in the art that other processes may be employed without departing from the spirit and scope of the present invention. For example, any prior art process such as that disclosed in U.S. Pat. Nos. 5,666,028 or 5,451,822 issued to Bechtel et al., may be modified to utilize any of the information made available through implementation of the present invention, to improve the manner in which the head lamps are controlled.

C. Navigation System

Navigation systems are currently drawing much attention for use in automobiles generally due to the availability and access to GPS satellite positional data. While some navigation systems have been commercially implemented, such systems are often quite expensive and difficult to accommodate within the interior of a vehicle, where the displayed information can be readily viewed by the driver without unduly distracting the driver from his or her driving. Other difficulties in implementing navigation systems relate to the provision of a large amount of data showing the detailed level of road map information in all or specific regions of the country. Largely, however, such navigation systems are not in widespread use due to the relatively expensive price associated with such systems.

The present invention overcomes many of the difficulties noted above by providing a relatively simple and inexpensive navigation system. Additionally, the inventive navigation system may be readily retrofit in any existing vehicle. Further still, the navigation system of the present invention allows the use of a conventional laptop computer, so as to provide portability of the more expensive component of the navigation system between a user's different vehicles. These aspects of the present invention are achieved by providing an IR transmitter 134 (FIG. 6) that is coupled to microprocessor 110, so as to transmit an IR signal including vehicle position data as received from microwave receiver 115 when configured to receive signals from a position identification system, such as GPS or GLONASS. By transmitting the IR signal in NMEA format using a standard IrDA protocol, the IR signal may be readily picked up by most laptop computers available on the market today that include an IR port for receiving data transmitted in an IR signal. In this manner, the data obtained from GPS satellites or the like may be directly transmitted via the IR signal into the passenger compartment to any one or more laptop computers, which may use the information while executing a program such as MICROSOFT MAP™ or MICROSOFT EXPEDIA STREETS 98™ so as to display on the computer screen a moving map showing the present location of the vehicle. Thus, the present invention would work with a wide variety of available laptop computers, as well as a wide variety of different navigational programs presently available on the market. Insofar as many people now own or have access to such laptop computers and insofar as such navigational programs are relatively inexpensive, the present invention provides an inexpensive navigational system that may be upgraded at any time through the upgrading of any navigational software, while also allowing the computer and display device of the navigation system to be used for a wide variety of other purposes as such laptop computers are already employed.

While laptop computers have been contemplated for use as a navigation system when physically connected to a GPS receiver, such GPS receivers are typically not mounted in the vehicle, but are separate physical devices that require an electrical power connection separate from that of the computer. While such setups offer much of the same advantages as the present invention, they cannot always be implemented, since some vehicles only include a single power outlet. Additionally, the added physical connections that are required to connect the GPS to a power outlet of the vehicle and to a serial port of the laptop computer can become quite cumbersome and limit the locations in which the laptop computer may be positioned so as to allow the driver or other vehicle occupants to readily view the display screen on the computer. The present invention, on the other hand, would allow the laptop computer to be operated without any external connections when operating on the power supplied by its internal rechargeable battery.

The prior systems utilizing a separate GPS receiver physically connected to a laptop computer also do not provide other advantages offered by the present invention—namely, the use of the data from the GPS receiver by other components within the vehicle. As described above and further described below, the data from microwave receiver 115 may be used to more accurately control various electrical components within the vehicle. Further, the transmitted IR or RF signal may be used by other electronic devices within the vehicle, such as a cellular telephone, if equipped with an IR or RF receiver. Such information would be particularly useful should it become necessary for a vehicle occupant to make an emergency telephone call when the vehicle occupant does not know their present location. By making such vehicle position information available to the cellular telephone, this information may be automatically transmitted to an emergency service operator whenever an emergency call is made using a telephone within the passenger compartment.

While the microwave receiver 115, microprocessor 110, and transmitter 134, which would be used to implement the inventive navigation system, have been described above as being located within a rearview mirror assembly, it will be appreciated by those skilled in the art that the advantages offered by the inventive navigation system may be obtained regardless of the location of these components. Moreover, each of the components may be remotely located from each other within the vehicle. However, to enable the system to be readily retrofit into an existing vehicle, it would be preferable to include these components in a single vehicle accessory housing. For example, provided these accessories are located within a rearview mirror housing, one could simply replace their existing rearview mirror assembly with one incorporating the inventive components and thereby obtain the benefits of the present invention without requiring any further reconfiguration of the electrical control system within the vehicle.

It is further noted that the location of transmitter 134 along a bottom surface of mirror housing 30 serves as a very convenient and effective location for mounting the transmitter, so as to enable it to transmit the IR signal throughout the front portion of the passenger compartment where a laptop computer 21 (FIG. 1) would likely be located. The transmitter, however, could also be located remotely in center portion of the vehicle headliner proximate a dome or map lights, so as to enable transmission of the IR signal to a back seat of the vehicle. With transmitter 134 remotely located, microprocessor 110 could transmit the vehicle position data over a discrete connection or via vehicle bus 117. Further, it should be noted that more than one IR transmitter may be positioned within the vehicle so as to more widely disperse the transmission of the vehicle position data as contained in the IR signals.

According to another aspect of the present invention, a navigation system may also be provided by displaying navigation-related information on a display 45 mounted on rearview mirror assembly 10. Such information could prompt the driver to "turn left now" or to "continue to proceed north," or provide similar directions. Further, mirror assembly 10 could include indicator lights positioned behind a transparent insignia etched in the reflective surface of mirror 40. For example, the mirror may have right and left arrows 170 and 172 etched in its reflective surface, such that the activation of an indicator light behind such insignias would advise the driver to turn left or right at an upcoming intersection. Microprocessor 110 may process the vehicle position data and access map information so as to control the indicators or provide the navigation prompts in any manner known in the art.

According to yet another aspect, the navigation system of the present invention may be used to provide the vehicle position information to a separate navigation system 146 via vehicle bus 117. Thus, provided the navigation system 146 is configured so as to be capable of receiving vehicle position data over a vehicle bus, the microwave receiver 115 may be mounted in a rearview mirror assembly, and preferably in the mounting foot of a rearview mirror, and supply the received information to the navigation system regardless of its location within the vehicle.

D. Tire Pressure Monitoring System

Electrical systems in vehicles are known that monitor the tire pressure of each of the vehicle's tires and either provide a warning when the sensed tire pressure is abnormal or simply display the sensed tire pressure to the driver. Such systems typically include a pressure sensor mounted inside each of the tires of the vehicle for sensing the pressure and transmitting a signal representing the sensed tire pressure over a wireless link to a central receiver. A control circuit coupled to the receiver either controls the display to display the sensed tire pressures or compares the sensed tire pressures to threshold levels, so as to determine whether a tire pressure abnormality exists (i.e., whether the sensed tire pressure is too low or too high). When the tire pressure in any tire is abnormal, the control circuit would then activate an indicator, which may be an audio or visual warning, so as to advise the driver of the abnormality.

While the above-noted tire pressure monitoring systems generally work effectively, the accuracy of the systems would be improved by taking into account the altitude of the vehicle, since the altitude affects the relative readings of the tire pressure.

Accordingly, it is an aspect of the present invention to provide a tire pressure monitoring system that determines the vehicle's current altitude and adjusts the sensed tire pressures as a function of the current altitude. To take into account the vehicle's current altitude, the control circuit used in the tire pressure monitoring system of the present invention is adapted to be communicatively coupled to a source of data from which the vehicle's current altitude may be determined. As described above, microwave receiver 115 may serve as a source of such data when it is tuned to receive transmissions from satellites of a position identification system such as GPS.

The pressure monitoring system of the present invention may then use the adjusted tire pressures so as to operate a display, such as display 45, to display the adjusted tire pressures or to operate display 45 or some other indicator whether audio or visual, to indicate when an abnormal tire pressure exists based upon a comparison of the adjusted tire pressures to at least one threshold value. The at least one threshold value may include a low tire pressure threshold and/or a high tire pressure threshold.

In the most preferred embodiment, the control circuit is implemented using microprocessor 110, and the source of altitude information is microwave receiver 115. The receiver used to receive the signals from the tire pressure sensors mounted in the tires may be receiver 136 that may be mounted in a common housing, such as a rearview mirror assembly, with microprocessor 110 and microwave receiver 115. Further still, microprocessor 110 may utilize display 45 to display tire pressure, or may activate some other indicator that may be provided behind the mirror or may transmit an activation signal over vehicle bus 117 to some other display 166 that is also coupled to bus 117. It should also be noted that the receiver of the tire pressure monitoring system as well as the control circuit may be remotely located from microwave receiver 115, whereby the altitude information is transferred to tire pressure monitoring system via bus 117. Additionally, the altitude information may be used to adjust the threshold levels at which a warning is issued. rather than adjusting the sensed tire pressure.

In addition to using the altitude information for tire pressure sensing and monitoring, the altitude information could also be transmitted over vehicle bus 117 to other vehicle systems, such as the engine control system.

E. Temperature Sensing and Display System

Electrical systems for sensing and displaying exterior temperature are well known in the art. Such systems typically include a temperature sensor mounted so as to be exposed to the external air, while being electrically coupled to a control circuit located inside the vehicle, which processes the temperature information obtained from the sensor and displays the information on a display that is typically located on the display of an overhead console, inside rearview mirror, or instrument panel of the vehicle. Because the temperature sensed by the temperature sensor is affected by the velocity of the vehicle, such systems typically obtain vehicle velocity data from the speedometer of the vehicle, so as to compensate the temperature reading from the external sensor to account for the velocity of the vehicle. If the temperature display is located in the overhead console or inside the rearview mirror, it becomes a practical necessity that the vehicle speedometer be configured so as to provide the vehicle speed on the vehicle bus, so that the control circuit for the temperature sensing and display system can take the velocity into account when compensating the external temperature reading. Additionally, a common location for the external temperature sensor is in front of the radiator. This sensor becomes inaccurate if the vehicle is stopped for a relatively short period of time, since heat from the radiator will cause the temperature sensor to read high. If the vehicle is turned off long enough for the radiator to cool, the sensor will become accurate again. Typically, the radiator cooling period is around 2 hours. Present practice is to use an analog timer circuit to determine if the vehicle has been in operation in the last two hours. If so, the last known temperature before the car was switched off is displayed rather the inaccurate sensor reading. The displayed temperature is then updated at slow rate for a fixed period of time corresponding to the time required for the sensor to again accurately register ambient temperature. With the availability of data from the bus or GPS, a separate analog timer is no longer required. The fixed time delay can be shortened at higher vehicle speeds if speed is known.

The temperature sensing and display system of the present invention does not require that the vehicle speedometer output the vehicle velocity onto a vehicle bus or that any other discrete connection between the vehicle speedometer be made to the control circuit of the inventive system. The inventive temperature sensing and display system includes a temperature sensor 158 mounted to the vehicle for sensing the temperature external to the vehicle and for generating a signal representing the sensed external temperature, a microwave receiver 115 for receiving transmissions from satellites of a position identification system constellation, and for generating vehicle position data from the satellite transmissions, a control circuit such as a microprocessor 110 coupled to the temperature sensor, and microwave receiver for determining the velocity of the vehicle based upon changes in the vehicle position data per unit of time. The control circuit receives the signal generated by the temperature sensor and adjusts the sensed external temperature reading as a function of the vehicle velocity so as to generate an external temperature display signal. The inventive temperature sensing and display system further includes a display 45 coupled to the control circuit for receiving the external temperature display signal and displaying the adjusted external temperature. To adjust the sensed external temperature reading, the control circuit may utilize any conventional algorithm.

As will be appreciated by those skilled in the art, temperature sensor 158 may be coupled to microprocessor 110 through vehicle bus 117 or through a discrete connection. Further, if microprocessor 110 is coupled to vehicle bus 117, microprocessor 110 may transmit the external temperature display signal to another display 166 located remotely within the vehicle via vehicle bus 117. Further, microwave receiver 115 may be remotely located from microprocessor 110 and provide the vehicle position data over vehicle bus 117 or through a discrete connection.

The particular use of velocity information that is ascertained from the vehicle position data of microwave receiver 115 is advantageous over utilizing the speed from speedometer 152 insofar as microprocessor 110 may use the same vehicle velocity data for other control functions, such as taking the velocity into account when controlling electrochromic mirror(s) 120 or the vehicle head lamps 142. Moreover, the vehicle velocity obtained from the data supplied from microwave receiver 115 may also be used to verify the accuracy of speedometer 152.

F. Vehicle Compass System

Electronic vehicle compass systems are known that include electronic compass sensors for sensing the earth's magnetic field, and generate an electrical signal representing the vehicle's direction of travel based upon the sensed magnetic field. Such systems are typically calibrated based upon sensor readings obtained while driving the vehicle through one or two closed loops. Such calibration techniques are also well known and described in U.S. Pat. No. 5,761,094. These known electronic compass systems compensate the compass sensor readings based upon the calibration data as well as other filtering parameters, and display the current vehicle heading on a display device commonly provided in the overhead console or interior rearview mirror of the vehicle. One of these parameters is used to adjust the vehicle heading based upon a geographical zone of variance in which the vehicle is currently located. Typically, a user is required to manually input in which zone the vehicle is currently located. U.S. Pat. No. 5,761,094, however, utilizes vehicle position data obtained from a GPS receiver to determine the vehicle's current location and to determine which zone of variance the compass system should use to further compensate the sensed vehicle heading.

As noted above, the prior art electronic compass systems all utilize some form of device that senses the earth's magnetic field. Such sensing devices are relatively expensive and must be mounted in particular locations within the vehicle so that the sensors are not adversely affected by the metal structure of the vehicle, which may introduce errors to the magnetic sensors. Such magnetic sensors are also susceptible to errors resulting from driving over railroad tracks and driving in large cities. Further, the compasses must be calibrated for each different model vehicle in which it is mounted, since the body style of these different model vehicles may have differing effects on the way in which the compass sensors sense the earth's magnetic field and sense the vehicle's current heading.

The compass system according to the present invention overcomes the problems noted above with respect to conventional electronic compass systems. According to one aspect of the present invention, the compass system includes an electronic compass sensor for sensing the earth's magnetic field and for generating an electrical signal representing the vehicle's direction of travel based upon the sensed magnetic field, a microwave receiver for receiving transmissions from satellites of a position identification system constellation and for generating vehicle position data from the satellite transmissions, a control circuit coupled to the electronic compass sensor and to the microwave receiver for determining the vehicle's direction of travel from the vehicle position data received from the microwave receiver, adjusting the vehicle's direction of travel as identified by the electronic compass sensor using calibration data, comparing the vehicle's direction of travel as determined using the vehicle position data with the vehicle's direction of travel as received from the electronic compass, and recalibrating the compass system when the vehicle's direction of travel as determined by both the microwave receiver and the adjusted electronic compass sensor readings are not the same. The compass system further includes a vehicle direction indicator, such as display 45, coupled to the control circuit for advising a vehicle occupant of the vehicle's direction of travel.

If combined with a magnetic sensor, the GPS heading data may be used to provide continuous calibration correction for the magnetic sensor, allowing placement of the magnetic sensor in a non-fixed location, such as inside the movable portion of the rearview mirror assembly. Magnetic, angle rate, speedometer, odometer, or other inertial sensor data can then be used to supplement GPS data when buildings or other environmental obstacles interfere with reception of the GPS satellite constellation.

According to yet another aspect of the present invention, the inventive compass system does not include an electronic compass sensor or any other form of sensor that senses the earth's magnetic field, but instead utilizes vehicle position data that is derived from transmissions received from satellites of a position identification system constellation utilizing a microwave receiver that is mounted in the vehicle. By utilizing the vehicle position data that is available from microwave receiver 115, a control circuit including microprocessor 110 may use this data to directly determine the vehicle's current heading, which is subsequently displayed on display device 45. Thus, the inventive electronic compass system may be constructed without utilizing an electronic compass sensor, and may therefore provide accurate vehicle heading information independent of the earth's magnetic field and its inherent anomalies when sensed by a sensitive electronic compass sensor. Accordingly, much of the expense of providing such magnetic field sensors may be eliminated.

G. Vehicle "Black Box" Data Recorder

Vehicle data recorders, also known as a "black box," have been used in automobiles. Such data recorders record time-stamped vehicle data including vehicle speed, vehicle direction, position of the vehicle, application of the vehicle brakes, and/or air bag deployment. This time-stamped data may then be read from memory to enable law enforcement officials to reconstruct the scene of an accident in a manner similar to how such black boxes are used in reconstructing the events immediately preceding an airplane crash. Such automobile data recorders contemplate the use of a clock signal from the vehicle's clock for purposes of placing a time stamp on the data that is stored in memory. This data may be stored in a circular first-in-first-out manner so that data covering the most recent fixed time period is stored in memory. The data recorder would stop recording upon detection that the airbags have deployed or upon detection of impact by impact or other inertial detectors otherwise located within the vehicle.

Additionally, these data recorders could record intermittent events, such as the number of times the car goes over 100 mph. Thus, when the user brings the car in for warranty work, the dealer can determine how this car is being abused.

One problem with these types of systems is that the vehicle clock may not be set to the correct the time when a crash-occurs. This is particularly problematic when more than one vehicle is involved and the clocks on both vehicles are set to different times. Thus, the times that are stored in memory may be subject to corruption by a user who purposely sets a time that is, for example, five minutes faster or five minutes slower than the correct time of day.

The present invention overcomes the above-noted problems associated with automobile data recorders by utilizing a clock signal obtained from at least one satellite for purposes of time stamping the vehicle-generated data that is recorded in the vehicle's data recorder memory. The satellites of the GPS constellation currently transmit the time of day as derived from an atomic clock so as to be highly accurate. By utilizing the clock signal from satellites in this manner, the time stamps on the vehicle data contained in two different vehicles involved in a single crash would then be accurately synchronized and thus provide a more accurate representation of the events that occurred immediately preceding the accident. Furthermore, because the clock signal is coming from an external source, the data recorder of the present invention would not be as susceptible to user corruption as would be the prior contemplated data recording systems.

The inventive data recorder system may be implemented using portions of electrical control system 100 (FIG. 6). Specifically, the data recorder could be implemented using microwave receiver 115, microprocessor 110, memory 126, a vehicle bus interface 116 coupled to a vehicle bus 117, or alternatively a discrete connection interface 118 that is discretely connected to the various sources of vehicle-generated data to be stored in the data recorder. Further, the data recorder could include a battery back-up (not shown) for maintaining power to memory 126 in the event of other power disruption caused by the accident. The components of the data recorder are preferably mounted in a rearview mirror assembly, but may also be mounted in any other location within the vehicle. Further, the various components making up the inventive data recorder system may be commonly housed in a single housing or remotely located throughout the vehicle.

In addition to transmitting GPS data, IR or RF transmitter 134 may also be used to transmit anything off the vehicle network. For example, most diagnostic ports are under the hood of the vehicle. If the vehicle is in a front end collision (most common type), the diagnostic port under the hood is hard to access. Because it may be very desirable to get accident data out of a car (direction traveled, recent speeds, etc.), the transmitter could transmit IR/RF signals to a hand held receiver that supplies the accident data to either the police or a technician.

H. Vehicle Odometer Verification System

By law, all automobiles are required to include an odometer if used within the United States. As well known, odometers provide an accumulated distance of travel over the lifetime of the vehicle. Because of the potential for individuals and used car dealers to fraudulently roll back the odometer, much effort has been made to ensure that the odometers are tamper proof. Nevertheless, there remains a concern that a sufficiently skilled individual may nevertheless be able to roll back an odometer on a vehicle and commit fraud on the purchaser of the vehicle. Also, odometers sometimes malfunction and do not record the distance traveled correctly or even at all.

The present invention ameliorates the above concerns by providing a vehicle odometer verification system, whereby a control circuit is coupled to a microwave receiver so as to receive vehicle position data that is transmitted to the receiver from satellites of a position identification system constellation. The control circuit utilizes the vehicle position data to determine and accumulate vehicle distance of travel. The control circuit may use this information to verify the odometer reading or may additionally or alternatively store the accumulated distance of travel data so computed in a memory device. In this manner, a purchaser of a used vehicle or a law enforcement officer may confirm that the reading on the vehicle's odometer is accurate by reading the accumulated distance of travel computed by the control circuit from its connected memory device.

The inventive vehicle odometer verification system may be implemented using microwave receiver 115, microprocessor 110, and memory 126 of electrical control system 100. Additionally, if microprocessor 110 is to compare and verify the reading of the vehicle's odometer, microprocessor 110 would be somehow coupled to the vehicle odometer 154 either via vehicle bus 117 or via a discrete connection.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A headlight control system for automatically turning on headlights of a vehicle, said system comprising:
   an ambient light sensor for sensing ambient light levels outside of the vehicle; and
   a control circuit adapted to be coupled to said ambient light sensor, a source of a clock signal that identifies the time of day, and to an electrical system of the vehicle so as to be capable of causing said headlights to turn on, said control circuit causing the vehicle headlights to be turned on in response to ambient light levels sensed by said ambient light sensor and in response to the time of day identified in the clock signal.

2. The headlight control system as defined in claim 1, wherein said control circuit filters the sensed ambient light level based upon the time of day and compares the filtered ambient light level to a first threshold level and causes the vehicle headlights to be turned on when the filtered ambient light level falls below the first threshold, level.

3. The headlight control system as defined in claim 2, wherein said control circuit filters the sensed ambient light level based upon the time of day by decreasing a response time to the falling of the sensed ambient light level below the first threshold when the time of day indicates that it is nighttime.

4. The headlight control system as defined in claim 2, wherein said control circuit filters the sensed ambient light level based upon the time of day and compares the filtered ambient light level to a second threshold level and causes the vehicle headlights to be turned off when the filtered ambient light level rises above the second threshold level.

5. The headlight control system as defined in claim 4, wherein said control circuit filters the sensed ambient light level based upon the time of day by decreasing a response time to the falling of the sensed ambient light level below the first threshold and by increasing a response time to the rising of the sensed ambient light level above the second threshold when the time of day indicates that it is nighttime.

6. The headlight control system as defined in claim 1, wherein said control circuit filters the sensed ambient light level based upon the time of day and compares the filtered ambient light level to a first threshold level and causes the vehicle headlights to be turned off when the filtered ambient light level rises above the first threshold level.

7. The headlight control system as defined in claim 6, wherein said control circuit filters the sensed ambient light level based upon the time of day by increasing a response time to the rising of the sensed ambient light level above the first threshold when the time of day indicates that it is nighttime.

8. A headlight control system for automatically turning on headlights of a vehicle, said system comprising:
   an ambient light sensor for sensing ambient light levels outside of the vehicle;
   a microwave receiver for receiving signals from satellites in the sky over the vehicle and thereby tracking the location of the satellites relative to the vehicle and monitoring the presence or absence of a signal received from each of the satellites; and
   a control circuit adapted to be coupled to said ambient light sensor, said microwave receiver, and to an electrical system of the vehicle so as to be capable of causing said headlights to turn on, said control circuit configured to determine what portions of the microwave receiver's view of the sky over the vehicle are blocked by a potentially light blocking/filtering obstruction based upon a determination of whether a signal is or is not being received from one or more of the satellites, said control circuit being responsive to ambient light levels sensed by said ambient light sensor for causing the vehicle headlights to be turned on, wherein the responsiveness of the control circuit to changes in ambient light levels is changed as a function of the portions of the sky above the vehicle that are potentially obstructed by a light blocking/filtering structure.

9. A headlight control system for automatically, turning on headlights of a vehicle, said system comprising:
   an ambient light sensor for sensing ambient light levels outside of the vehicle; and
   a control circuit adapted to be coupled to said ambient light sensor, a source of vehicle velocity data, and to an electrical system of the vehicle so as to be capable of causing said headlights to turn on, said control circuit causing the vehicle headlights to be turned on in response to ambient light levels sensed by said ambient light sensor and in response to the vehicle velocity.

10. The headlight control system as defined in claim 9, wherein said control circuit filters the sensed ambient light level based upon the velocity of the vehicle and compares the filtered ambient light level to a first threshold level and causes the vehicle headlights to be turned on when the filtered ambient light level falls below the first threshold level.

11. The headlight control system as defined in claim 10, wherein said control circuit filters the sensed ambient light level based upon the velocity of the vehicle by decreasing a response time to the falling of the sensed ambient light level below the first threshold, with increasing vehicle velocity.

12. The headlight control system as defined in claim 10, wherein said control circuit filters the sensed ambient light level based upon velocity of the vehicle and compares the filtered ambient light level to a second threshold level and causes the vehicle headlights to be turned off when the filtered ambient light level rises above the second threshold level.

13. The headlight control system as defined in claim 12, wherein said control circuit filters the sensed ambient light level based upon the velocity of the vehicle by decreasing a response time to the falling of the sensed ambient light level below the first threshold or rising above the second threshold, with increasing vehicle velocity.

14. The headlight control system as defined in claim 9, wherein said control circuit filters the sensed ambient light level based upon the velocity of the vehicle and compares the filtered ambient light level to a first threshold level and causes the vehicle headlights to be turned off when the filtered ambient light level rises above the first threshold level.

15. The headlight control system as defined in claim 14, wherein said control circuit filters the sensed ambient light level based upon the velocity of the vehicle by increasing a response time to the rising of the sensed ambient light level above the first threshold, with decreasing vehicle velocity.

16. A headlight control system for a vehicle, said system comprising:
   a sensor for sensing light levels outside of the vehicle; and
   a control circuit adapted to be coupled to said sensor, a source of a clock signal that identifies the time of day, and to an electrical system of the vehicle so as to be capable of controlling the headlights, said control circuit controlling the vehicle headlights in response to light levels sensed by said sensor and in response to the time of day identified in the clock signal.

17. The headlight control system as defined in claim 16, wherein said sensor is an ambient light sensor for sensing ambient light levels outside the vehicle.

18. The headlight control system as defined in claim 16, wherein said sensor is mounted to a rearview mirror assembly of the vehicle.

19. The headlight control system as defined in claim 16, wherein said source of said clock signal is a microwave receiver.

20. The headlight control system as defined in claim 19, wherein said microwave receiver is a GPS receiver.

21. The headlight control system as defined in claim 16, wherein said control circuit controls the headlights by turning the headlights on and off.

22. The headlight control system as defined in claim 21, wherein the headlights turned on and off are the low beam headlamps of the vehicle.

23. A headlight control system for a vehicle, said system comprising:
   a sensor for sensing light levels outside of the vehicle;
   a microwave receiver for receiving signals from satellites in the sky over the vehicle and thereby tracking the location of the satellites relative to the vehicle and monitoring the presence or absence of a signal received from each of the satellites; and
   a control circuit adapted to be coupled to said sensor, said microwave receiver, and to an electrical system of the vehicle so as to be capable of controlling the headlights, said control circuit configured to determine what portions of the microwave receiver's view of the sky over the vehicle are blocked by a potentially light blocking/filtering obstruction based upon a determination of whether a signal is or is not being received from one or more of the satellites, said control circuit being responsive to light levels sensed by said sensor for controlling the vehicle headlights, wherein the responsiveness of the control circuit to changes in light levels is changed as a function of the portions of the sky above the vehicle that are potentially obstructed by a light blocking/filtering structure.

24. The headlight control system as defined in claim 23, wherein said sensor is an ambient light sensor for sensing ambient light levels outside the vehicle.

25. The headlight control system as defined in claim 23, wherein said sensor is mounted to a rearview mirror assembly of the vehicle.

26. The headlight control system as defined in claim 23, wherein said microwave receiver is mounted to a rearview mirror assembly of the vehicle.

27. The headlight control system as defined in claim 23, wherein said microwave receiver is a GPS receiver.

28. The headlight control system as defined in claim 23, wherein said control circuit controls the headlights by turning the headlights on and off.

29. The headlight control system as defined in claim 28, wherein the headlights turned on and off are the low beam headlamps of the vehicle.

30. A headlight control system for a vehicle, said system comprising:
   a sensor for sensing light levels outside of the vehicle; and
   a control circuit adapted to be coupled to said sensor, a microwave receiver, and to an electrical system of the vehicle so as to be capable of controlling the headlights, said control circuit controlling the vehicle headlights in response to light levels sensed by said sensor and in response to vehicle velocity provided by the microwave receiver.

31. The headlight control system as defined in claim 30, wherein said sensor is an ambient light sensor for sensing ambient light levels outside the vehicle.

32. The headlight control system as defined in claim 30, wherein said sensor is mounted to a rearview mirror assembly of the vehicle.

33. The headlight control system as defined in claim 30, wherein said microwave receiver is a GPS receiver.

34. The headlight control system as defined in claim 30, wherein said control circuit controls the headlights by turning the headlights on and off.

35. The headlight control system as defined in claim 34, wherein the headlights turned on and off are the low beam headlamps of the vehicle.

36. A headlight control system for a vehicle, said system comprising:
   a sensor for sensing light levels outside of the vehicle;
   a microwave receiver for receiving signals from satellites in the sky over the vehicle; and
   a control circuit adapted to be coupled to said sensor, said microwave receiver, and to an electrical system of the vehicle so as to be capable of controlling the headlights, said control circuit being responsive to light levels sensed by said sensor and to information provided by said microwave receiver for controlling the vehicle headlights.

37. The headlight control system as defined in claim 36, wherein said information provided by said microwave receiver is the time of day.

38. The headlight control system as defined in claim 36, wherein said information provided by said microwave receiver is the velocity of the vehicle.

39. The headlight control system as defined in claim 36, wherein said microwave receiver tracks the location of the satellites relative to the vehicle and monitors the presence or absence of a signal received from each of the satellites, and wherein said control circuit is configured to determine what portions of the microwave receiver's view of the sky over the vehicle are blocked by a potentially light blocking/filtering obstruction based upon a determination of whether a signal is or is not being received from one or more of the satellites, wherein the responsiveness of the control circuit to changes in light levels is changed as a function of the portions of the sky above the vehicle that are potentially obstructed by a light blocking/filtering structure.

* * * * *